(12) United States Patent
Tsing

(10) Patent No.: US 9,865,013 B1
(45) Date of Patent: Jan. 9, 2018

(54) SYSTEMS AND METHODS FOR SOCIAL SHOPPING

(71) Applicant: BondsWell, Inc., Fremont, CA (US)

(72) Inventor: Michelle Tsing, San Jose, CA (US)

(73) Assignee: Bondswell, Inc., Fremont, CA (US)

( * ) Notice: Subject to any disclaimer, the term of this patent is extended or adjusted under 35 U.S.C. 154(b) by 363 days.

(21) Appl. No.: 14/641,246

(22) Filed: Mar. 6, 2015

Related U.S. Application Data

(60) Provisional application No. 61/949,165, filed on Mar. 6, 2014.

(51) Int. Cl.
G06Q 30/00 (2012.01)
G06Q 30/06 (2012.01)
G06Q 50/00 (2012.01)

(52) U.S. Cl.
CPC ......... *G06Q 30/0631* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 6,415,264 B1 * | 7/2002 | Walker | ............... | G06Q 20/00 705/26.3 |
| 7,913,178 B2 * | 3/2011 | Gould | ............... | G06Q 10/10 715/762 |
| 9,047,584 B2 * | 6/2015 | Baldwin | ............ | G06Q 10/10 |
| 2001/0044751 A1 * | 11/2001 | Pugliese, III | ......... | G06Q 30/02 705/14.1 |
| 2006/0173702 A1 * | 8/2006 | Saxena | ................ | G06Q 10/10 705/26.1 |
| 2008/0086386 A1 * | 4/2008 | Bell | ................... | G06Q 30/0206 705/7.35 |
| 2008/0147797 A1 * | 6/2008 | Ramaswamy | ......... | G06Q 10/10 709/204 |
| 2008/0162265 A1 * | 7/2008 | Sundaresan | ....... | G06F 17/30867 707/781 |
| 2011/0016023 A1 * | 1/2011 | Zakas | ................ | G06Q 30/0603 705/27.1 |
| 2011/0307340 A1 * | 12/2011 | Benmbarek | ............ | G06Q 30/02 705/14.73 |

(Continued)

OTHER PUBLICATIONS

"Social shopping promotions from a social merchant's perspective" (Business Horizons (2012) vol. 55, 441-451; in Lee, Kyoochun Lee).*

*Primary Examiner* — Courtney L Stopp
(74) *Attorney, Agent, or Firm* — Sheppard Mullin Richter & Hampton LLP

(57) ABSTRACT

Various embodiments of the present disclosure can include systems, methods, and non-transitory computer readable media configured to receive information from a plurality of computing devices associated with a plurality of collaborating users in online collaboration to create a product connection displayed online as associated goods or services. The information from the plurality of computing devices can include selections of images associated with the goods or services. The product connection can be created based on the information from the plurality of computing devices. The product connection can be provided for display to users of a social shopping system.

19 Claims, 22 Drawing Sheets

(56) References Cited

U.S. PATENT DOCUMENTS

2012/0253972 A1* 10/2012 Oskolkov .............. G06Q 30/02
  705/26.8
2012/0323690 A1* 12/2012 Michael ................. G06Q 30/02
  705/14.58
2014/0172622 A1*  6/2014 Baronshin ............. G06F 3/0482
  705/26.7

* cited by examiner

SYSTEMS AND METHODS FOR SOCIAL SHOPPING

CROSS-REFERENCE TO RELATED APPLICATIONS

This application claims priority to U.S. Provisional Patent Application No. 61/949,165, filed on Mar. 6, 2014 and entitled "SOCIAL SHOPPING SYSTEM," which is hereby incorporated herein by reference in its entirety.

FIELD OF THE INVENTION

The present technology relates to the field of product recommendations. More particularly, the present technology provides techniques for product recommendations in an online environment based on user credentials.

BACKGROUND

Conventional websites allow users to learn about products and to purchase products. Such websites are often focused on the presentation of products on an individual basis. For example, a website may allow a user to learn about features and specifications of a particular product. If the user wishes to learn about features and specifications of another product, he may need to conclude his consideration of the original product and transition his focus to the other product. Likewise, a website may allow a user to purchase a particular product. If the user wishes to purchase another product, he may need to conclude his purchase of the earlier product and transition his focus to the other product for purchase.

In some cases, the conventional websites also can provide recommendations to buy products. The recommendations can be from users of the websites. In many instances, the recommendations are a bare suggestion or exhortation to buy perhaps accompanied by the identity of the person or entity behind the recommendation. In some cases, the number of recommendations are aggregated to determine a total number of recommendations for a product. The total number of recommendations for a product can be presented to a user considering purchase.

SUMMARY

Various embodiments of the present disclosure can include systems, methods, and non-transitory computer readable media that are configured to receive information from a plurality of computing devices associated with a plurality of collaborating users in online collaboration to create a product connection displayed online as associated goods or services. The information from the plurality of computing devices can include selections of images associated with the goods or services. The product connection can be created based on the information from the plurality of computing devices. The product connection can be provided for display to users of a social shopping system.

In an embodiment, at least one of a number of the plurality of collaborating users in collaboration to create the product connection, a time period during which collaboration can occur, content to be included in the product connection, and frequency of sessions during which collaboration can occur can be controlled.

In an embodiment, the control can be based at least in part on an input applied by a first collaborating user of the plurality of collaborating users to a first computing device associated with the first collaborating user.

In an embodiment, the plurality of computing devices can include client devices in remote communication with the computing system.

In an embodiment, a shopping preference tool can be provided to a user of the social shopping system. In response to receipt of a selection of an element of the product connection by the user, an online checkout to purchase the element based on personal information and financial information of the user can be performed without directing the user to a website of the merchant.

In an embodiment, the product connection can be associated with at least one credential of at least one collaborating user of the plurality of collaborating users. The at least one credential for display can be provided with the product connection.

In an embodiment, an interface can be provided to a computing device associated with a creator of the product connection to allow the creator of the product connection to at least one of identify credentials of the creator with the product connection, share the product connection with friends, access other product connections related to the product connection, and seek status as a rock star of the social shopping system.

In an embodiment, an interface can be provided to a computing device associated with a user of the social shopping system to allow the user to at least one of share the product connection with friends, like the product connection, provide kudos to the product connection, review the product connection, and access other product connections related to the product connection.

In an embodiment, an editing tool can be provided to a computing device associated with at least one collaborating user of the plurality of collaborating users to remove white space or noise from an image associated with an element of the product connection.

In an embodiment, an amount of kudos, likes, comments, and reviews regarding the product connection can be received. A measure of validation of credentials of a creator of the product connection can be assigned based on the amount of kudos, likes, comments, and reviews regarding the product connection.

In an embodiment, a user of the social shopping system can be determined as a rock star based on a threshold amount of activity associated with product connections of the user. At least a portion of revenue generated by the product connections can be shared with the user.

In an embodiment, an editing tool to cut out a background in an image reflecting an element of the product connection can be provided to at least one collaborating user of the plurality of collaborating users.

In an embodiment, a feed about product connections of friends of the users can be provided to the users of the social shopping system.

In an embodiment, at least a portion of the product connection can be indicated as available for purchase.

In an embodiment, at least one link can be embedded in a webpage displaying the product connection, the link selectable for causing presentation of a website associated with at least one element of the product connection.

In an embodiment, a store of images associated with goods or services to be included in product connections can be maintained.

In an embodiment, at least a portion of the images in the store of images is provided by users of the social shopping system.

In an embodiment, at least a portion of the images in the store of images is provided by customers of the social shopping system after payment by the customers.

Many other features and embodiments of the disclosed technology will be apparent from the accompanying drawings and from the following detailed description.

Figure 1:
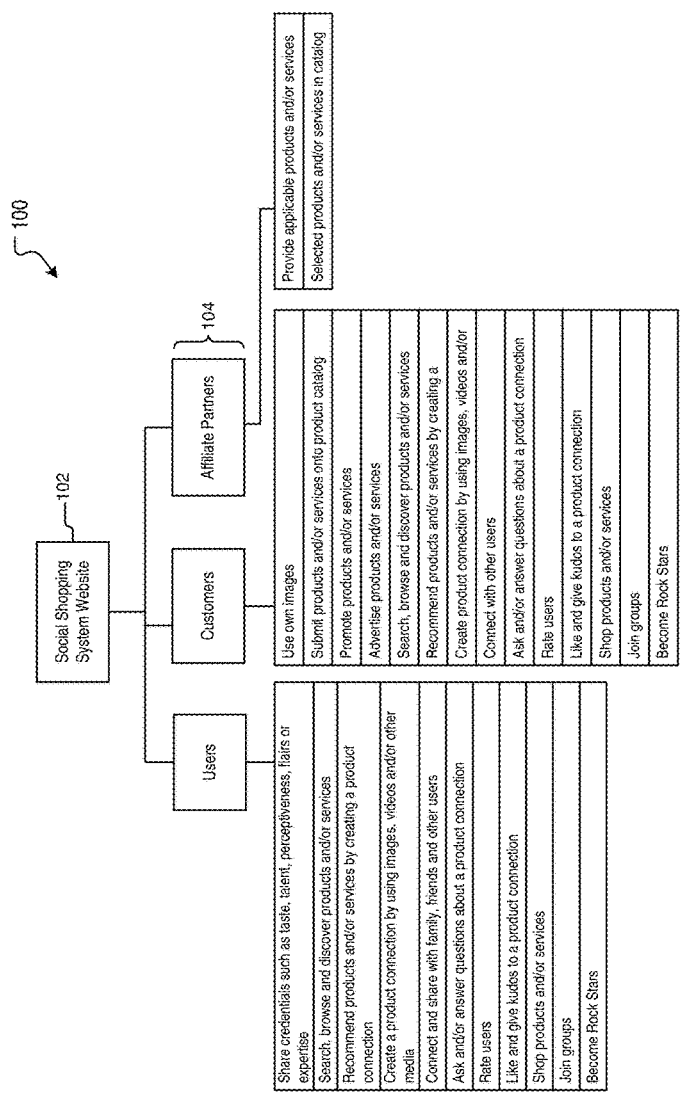
FIG. 1 illustrates an example environment of an example social shopping system, in accordance with an embodiment of the present disclosure.

The figures depict various embodiments of the present disclosure for purposes of illustration only, wherein the figures use like reference numerals to identify like elements. One skilled in the art will readily recognize from the following discussion that alternative embodiments of the structures and methods illustrated in the figures may be employed without departing from the principles of the disclosed technology described herein.

DETAILED DESCRIPTION

Today, there are many websites that allow users to recommend products. They focus primarily on singular products. Also, they may not tell users what additional products they should purchase or use with a primary recommended product. Online users of a network may not consider the expertise of other users in discovering what such users buy, in learning connections between various products and/or services, in improving their relevant knowledge base, and in helping them make better purchasing decisions and shop more efficiently.

FIG. 1 shows an example environment 100 of an example social shopping system 102 based on 1) user credentials and 2) recommendation of products and/or services by creating product connections based on the user's credentials, as well as other considerations discussed herein, in accordance with some embodiments of the present disclosure. The environment 100 includes a website of the social shopping system 102 with which various entities 104 can interact. The entities 104 can include users, customers, and affiliate partners.

The social shopping system 102 described allows the user to identify his credentials and it allows him to recommend products and/or services based on such credentials. Credentials can refer to a qualification, achievement, personal quality, aspect of a person's background, or the like, typically when used to indicate that he is suitable for something. Credentials may include an expertise, knack, or a flair.

The social shopping system 102 can monitor external credibility and validate credentials of a user in a variety of ways. Other users (e.g., another person or another entity) may like or provide a kudo to a product connection of the user. For example, if the user receives a high amount of likes and kudos, his credentials may be validated and the social shopping system 102 may provide, reflect, or otherwise convey such validation to other users of the social shopping system 102. The user may provide relevant and interesting stories to his product connection, which others may relate to and find helpful, thus further validating his credibility. The user may provide detailed and useful answers to questions about his product connection, and others may find the user credible and authoritative based on the stories and answers of the user, also validating his credentials. Others may also rate him by his preference, ability to influence, observable traits, discussion, etc., allowing the social shopping system 102 to confirm and validate his credentials. As trust is built in the user and the credentials of the user are established, others may base their purchasing decisions on the product connection of the user, as he consistently shows to others that he knows the nuances among various products and/or services as well as a more in depth knowledge about the product and/or services on which others can confidently rely.

The social shopping system 102 may provide functionality for the user and other users to express, either qualitatively or quantitatively, their assessment of the credentials of the user in relation to product connections or topics associated with product connections. For example, the user may have credentials for billiards. He may have played pool since he was a child, may have a natural talent for pool, or may have played in a pool league for many years. The social shopping system 102 allows the user to identify "billiards" as something that he is good at or has a flair for. It allows him to recommend products and/or services in the form of a product connection based on this credential. Thus, he may recommend pool sticks, bags or gloves. He may recommend where to play pool in certain cities or countries. His credential of being a good pool player can be externally validated or modified (e.g., increased or decreased) by the social shopping system 102 as other pool players may like or provide a kudo to his product connection, thus agreeing with, being inspired by, or otherwise supporting his recommendations. Other users may find his stories interesting or his response to questions helpful and insightful. Other users who are beginning to play pool may purchase pool sticks based on his recommendations after learning different options and nuances from him. The social shopping system 102 can allow other users to rate the credentials of the user. Overall, his rating may be high as others like and rely on his preference, influences, observable traits, and discussion. Thus, the social shopping system 102 allows the user's credentials for billiards to be externally validated and modified.

The social shopping system 102 described herein allows the user to create a product connection consisting of various products and/or services based on his credentials. Thus, the social shopping system 102 allows the user to show other users visually (e.g., images, video, audio, text, etc.) as well as within a story what goes well with each other and how the products and/or services are connected to each other. For example, the social shopping system 102 can allow the user with credentials for billiards to publish a product connection consisting of a pool stick, a bag, and a pair of gloves. Based on the publication of the product connection, another user who is in the market for a pool stick would not only know and learn about a certain brand of recommended pool stick, the other user would also learn about a certain brand of bag with a strap for the pool stick and a certain kind of gloves that may be preferred for pool players. Other users with the same credentials for billiards may be able to compare products and/or services and discover better products and/or services. Thus, the social shopping system 102 allows users to be engaged, share insights and shop efficiently, and in general be more economical and smarter consumers. The social shopping system 102 can also store user-generated titles of product connections and their respective credentials, category, and visibility.

The social shopping system 102 allows a user to shop in a context rather than focus primarily on a single product or a number of unrelated products. The social shopping system 102 allows the user to publish not only images of products and/or services, but also images telling a story of how products and/or services relate to one another, what accessories and/or other related products and/or services may be needed if one product is purchased, and how they complement one another in a "bond." A "bond" can refer to a product connection consisting of various products and/or services. For example, a bond could be a product connection consisting of a pool stick, a bag, and a pair of gloves published by the user with credentials for billiards. As another example, a bond could also be a product connection consisting of a pool hall, a certain kind of beer, favorite friends he plays pool with, and a pool table because these different elements tell other users a story about his experience of having a good time and how these different elements connect with one another. In some instances, a "bond" can be as simple as a few words if the user wishes. As used herein, "product connection" and "bond" are used interchangeably unless the context herein indicates otherwise.

Users are an important component of the environment of the social shopping system 102. The social shopping system 102 can allow a user to perform various activities including, without limitation, the following: identify user credentials; search, browse, and discover products and/or services; recommend products and/or services based on their relationship with each other; create a product connection using images, videos, and other media; connect with and share products and/or services with family, friends, and third parties; ask and/or answer questions about a product connection; review a product connection; rate users; like and give kudos to a product connection, products and/or services; join groups; and become "rock stars" to the social shopping system 102.

The social shopping system 102 can receive the credentials of the user by requesting the user to identify and provide the user's credentials. The user's credentials may include his talent, taste, and/or perceptiveness (in other words, "flairs") and otherwise, his expertise. The social shopping system 102 allows the user to share his credentials with his family, friends, and other third parties, thus enabling another user to establish a connection (e.g., an emotional connection) with the user based on a common credential or enabling another user to learn from the user because of his credentials. In some instances, the social shopping system 102 can determine credentials of a user based on the feedback of other users or based on the activities of the user in connection with the social shopping system 102.

The social shopping system 102 allows the user to search, browse, and discover product connections. If a user has credentials for billiards, for example, he may look for another user with the same credentials for billiards. Thus, the social shopping system 102 allows the two users to connect and thus share insights, discuss products and/or services, engage in private or public conversations, and build relationships with one another. As another example, if a user begins to learn billiards, he may look for another user with the credentials for billiards and learn not only which pool stick to purchase but also which accessories to purchase, such as gloves and bag to complement his pool stick.

The social shopping system 102 can enable the user to create a product connection by using images, videos and/or other media based on his credentials. The social shopping system 102 allows the user to place his recommended products and/or services into a product connection by uploading his own images, bookmarking images or videos from the web, or using other media that the social shopping system 102 can provide, as described in more detail herein. For example, a user with a credential for billiards may place a certain brand of pool stick, bag, and glove together into a product connection. The user may also recommend a place where he usually has fun playing pool with a certain brand of beer he likes and a certain brand of or a particular table on which he feels he can always win. Thus, the social shopping system 102 allows the user to tell his story through a product connection.

The social shopping system 102 allows the user to communicate over a network (e.g., the internet) with family, friends, and other third parties and share his credentials and product connections with other users privately or publicly. This communication and sharing enables users to discover product connections, engage with one another, build communities in groups, and shop more efficiently. In essence, the social shopping system 102 allows users to build strong emotional connections with one another.

The social shopping system 102 allows other users to ask and/or answer questions about a product connection. After a product connection is published on a website managed by the social shopping system 102, other users may view and discover the product connection. For example, if a user with credentials for billiards has built a product connection with a pool stick, a bag, and a pair of gloves, another user may ask him a product question. Or, the other user may ask him whether the pool stick would fit in and be protected by another bag or whether the pair of gloves comes in a different color other than black. By allowing other users to ask and answer questions, the social shopping system 102 can allow other users to rate the user, providing external credibility and validation of the user. The social shopping system 102 can also serve as a forum for engagement among users.

The social shopping system 102 allows other users to review a product connection. Review of a product connection can involve a specific item in a product connection or the product connection in its entirety. By allowing the users to review a product connection, the social shopping system 102 can build external credibility and validation of the user associated with the product connection. The social shopping system 102 can allow the user associated with the product connection to share with other users how the elements in the product connection interrelate or interact. The social shopping system 102 can share the overall impact or perception regarding the taste, usefulness, and experience of a product connection based on reviews of other users.

The social shopping system 102 can allow users to rate each other. A rating system within the social shopping system 102 maintains trust among users and encourages users to build product connections that are not only useful but also beautiful and that other users would love. The rating system also builds external credibility and validation of the user's credentials. Other users may rate the user based on the user's product connections, his stories, how many likes and kudos he receives, and his substance and knowledge as reflected in his answers to other users' questions.

The social shopping system 102 allows users to like and give kudos to a product connection. By enabling users to like and give kudos to a product connection, the specific product connection may be more credible. Also, based on the likes and kudos provided by other users, the social shopping system 102 can provide information to the user who created the product connection to understand how many users indicate interest, share the same credentials as him or would love to learn from him. The social shopping system 102 can encourage the user to feel good and thus provide incentive to create better and better product connections based on his credentials.

The social shopping system 102 allows a user to shop products and/or services. For instance, if another user is interested in purchasing the pool stick that the user with credentials for billiards recommended, then the social shopping system 102 allows the other user to click on the pool stick in the product connection or find the product in a shop page and then purchase the pool stick on the merchant's website. A shop page can include web resource, such as a marketplace, where users may click on the product and order from a merchant who sells the product.

The social shopping system 102 allows a user to join and create groups. The social shopping system 102 enables the user to find a group or create a new group. For example, the user with credentials for billiards may join a group for users with the same credentials or he may create a new group for users with credentials for billiards. The social shopping system 102 allows users to share product connections and establish communities in groups. In turn, users may make new friends, become more engaged, and be able to deepen their knowledge in a particular credential.

The social shopping system 102 can allow a user to become a "rock star" of the social shopping system 102. As discussed in more detail herein, the social shopping system 102 can allow the user to earn revenue by promoting products and/or services using his credentials and his ability to build product connections that other users love.

A customer is a type of user of the social shopping system 102. Customers are an important element of the environment of the social shopping system 102. The social shopping system 102 can support customers who pay to use premium features of the social shopping system 102. In addition to standard features, the social shopping system 102 may allow customers to upload their own images so that they can use them to create product connections. This allows the customer to personalize his product connection, allowing it to be more tailored to the customer's preferences or credentials and allowing the customer to promote his product among his network.

The social shopping system 102 allows customers, such as merchants, to create business accounts. The social shopping system 102 provides opportunities for merchants to submit images and other media into a product catalog of the social shopping system 102, thus allowing users to use such merchant products to create product connections based on their credentials. By doing so, the social shopping system 102 provides an opportunity for users to discover and purchase such merchant products and/or services.

The social shopping system 102 may allow certain customers to promote their products and/or services within the social shopping system 102 with special promotions, marketing campaigns, discount rates, trending products and/or services, and other customer promotions that may benefit the users from time to time.

The social shopping system 102 may allow advertisers to advertise their products and/or services within the social shopping system 102.

Affiliate partners can be an important element of the environment of the social shopping system 102. The social shopping system 102 allows affiliate partners' products and/or services to be included into a product catalog in order for users to recommend such products and/or services by using such products and/or services in their product connection. The social shopping system 102 allows affiliate partners' products and/or services to be included into the catalog and users to purchase affiliate partners' products and/or services in the marketplace within the social shopping system 102. The social shopping system 102 can charge affiliate partners for, and thus earn revenue from, placement of their products into the product catalog and purchases of such products by users. For example, the shopping system 102 can earn a commission from affiliate partners based on purchases of products or services sold by the affiliate partners.

The social shopping system 102 allows both a preselected portion of products and/or services associated with affiliate partners to be included into the catalog as curated by the social shopping system 102. The social shopping system 102 also allows customers to submit products and/or services into the product catalog, which allows users flexibility and variety in building his product connection. Furthermore, a user may clip other products and/or services from the world wide web to be included into a product connection. The social shopping system 102 allows the user to discover new products and/or services in addition to recommending known products and/or services.

A "credential" has been referred to as the following in certain circumstances: a qualification, achievement, personal quality, or aspect of a person's background, typically when used to indicate that they are suitable for something.

A "flair" has been referred to as the following in certain circumstances: 1. A natural talent or aptitude; a knack: a flair for interior decorating; 2. Instinctive discernment; keenness: a flair for the exotica; 3. Distinctive elegance or style: served us with flair.

As used herein, while the meaning of the terms "credential" and "flair" are related to the foregoing explanations, the terms as used herein are not limited to the foregoing explanations. Rather, the terms have meanings that are consistent with the explanation and context in which the terms appear herein.

Figure 2:
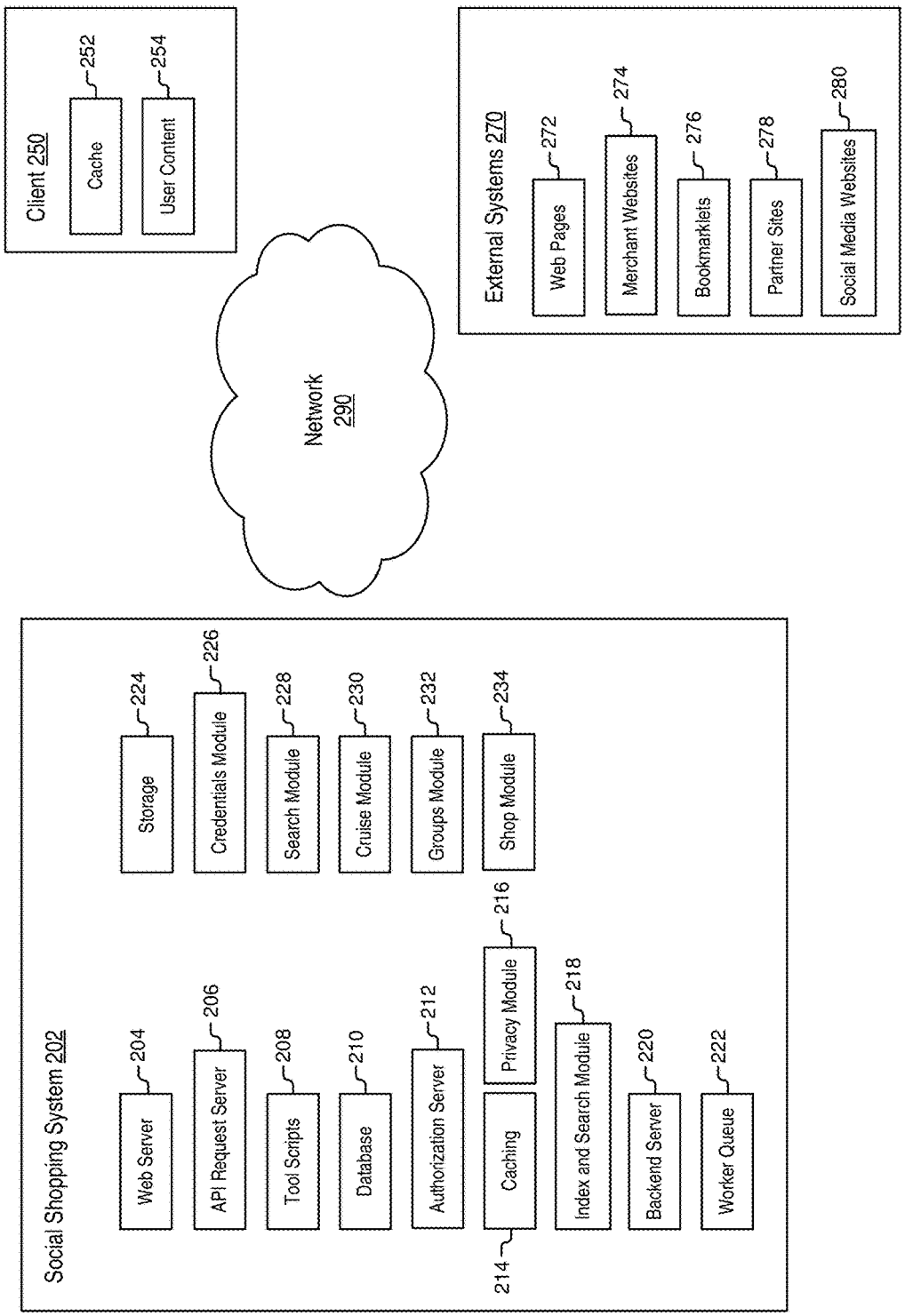
FIG. 2 illustrates an example social shopping system, in accordance with an embodiment of the present disclosure.

FIG. 2 is an example global network including a social shopping system 202 based on credentials, in accordance with some embodiments of the present disclosure. In some embodiments, the social shopping system 102 can be implemented by the social shopping system 202. The social shopping system 202 can include a web server 204, an API request server 206, tool scripts 208, a database 210, an authorization server 212, a caching server 214, a privacy module 216, an index and search module 218, a backend server 220, a worker queue 222, storage 224, a credentials module 226, a search module 228, a cruise module 230, a groups module 232, and a shop module 234. The various module of the social shopping system 202 cooperate and interact to perform the functionality of the social shopping system 202.

The global network also can include a client 250 including a cache 252 and user content 254. The client 250 can be any computing system or application running on a computing system that allows users, customers, and partner affiliates to interact with the social shopping system 202 and external systems 270. The client 250 can include in the cache 252 a stored state of a website of the social shopping system 202 or other pertinent information regarding use of the social shopping system 202. The user content 254 can include images that the user may upload to the social shopping system 202.

The global network also can include the external systems 270. The external systems 270 can be entities external to the social shopping system 202 or resources associated with such entities. The external systems 270 can include web pages 272 of other entities, merchant websites 274, bookmarklets 276, partner sites 278, and social media websites 280. The external systems 270 can be used by users, customers, and affiliate partners of the social shopping system 202 to access and interact with the social shopping system 202. The web pages 272 can include third party web pages that are accessible through links embedded in web pages provided by the social shopping system 202 that display a representation of the product connections. The web pages 272 can also include third party web pages that users may bookmark to later use as an element to create a product connection. A merchant website 274 can be accessed by a user clicking on an item in a product connection. A shop page associated with the merchant website 274 can be presented in response to the clicking and the user can purchase an item at the merchant website 274. The bookmarklets 276 associated with web pages can be used to allow users to clip content from the web pages and to publish such content on a website of the social shopping system 202. The partner sites 278 allows partners to promote, advertise, market, and otherwise interact with the social shopping system 202. The social media websites 280 can be employed by users to share their product connections on the social media websites 280 (e.g., Google+, Twitter, Facebook, etc.). In some instances, users may sign up for an account with the social shopping system 202 using their social media account credentials.

The global network may include a network 290. The network 290 can provide communications media to enable electronic communications among the social shopping system 202, the client 250, and the external systems 270. The network 290 can be implemented based on standard communications technologies and protocols. For example, the network 290 may include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 290 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 290 may be represented using technologies and/or formats including hypertext markup language (HTML) and extensible markup language (XML). In addition, all or some links may be encrypted using conventional encryption technologies such as secure sockets layer (SSL), transport layer security (TLS), and Internet Protocol security (IPsec).

In an embodiment of the present disclosure, the social shopping system 202 may include additional, integrated, fewer, or different components for various applications. Many other components, such as network interfaces, security mechanisms, load balancers, failover servers, management and network operations consoles, and the like are not shown so as to not obscure the details of the present disclosure. Likewise, many components and details of the client 250 and the external systems 270 are not shown so as not to obscure the details of the present disclosure.

The web server 204 can link the social shopping system 202 to one or more user devices (e.g., the clients 250) and/or one or more external systems (e.g., the external systems 270) via the network 290. The web server 204 can serve web pages, as well as other web-related content.

The API request server 206 can allow one or more of the external systems 270 and the clients 250 to provide information to and to access information from the social shopping system 202 by calling one or more APIs. The API request server 206 may also allow the external systems 270 to send information to the social shopping system 202 by calling APIs. For example, in some embodiments, an external system 270 can send an API request to the social shopping system 202 via the network 290, and the API request server 206 can receive the API request. The API request server 206 can process the request by calling an API associated with the API request to generate an appropriate response, which the API request server 206 can communicate to the external system 270 via the network 290.

The tool scripts 208 can conduct routine maintenance jobs on a website managed by the social shopping system 202. The tool scripts 208 can allow a system administrator to perform system administration such as import/export data, run background operations, etc. to keep the website up and consistent. The tool scripts 208 also can include crawling products of merchant websites and mapping the product information to the database 210 to support the management of product connections.

The database 210 can store some or all information relevant to operation of the social shopping system 202. An API layer can communicate with a cluster to store some or all necessary information, as described in more detail herein. In some embodiments, some or all entities (information maintained by the social shopping system 202) can be stored in a NoSQL database.

The authorization server 212 can enforce one or more privacy settings of the users of the social shopping system 202. A privacy setting of a user determines how particular information associated with a user can be shared. The privacy setting can comprise the specification of particular information associated with a user and the specification of the entity or entities with whom the information can be shared.

The caching server 214 can cache frequently used data in a memory middleware to increase speed and efficiency of the social shopping system 202.

The privacy module 216 can identify specific information to be shared with other users. The privacy module 216 can allow users to identify whether a product connection should be shared with only the user, friends, publicly, or otherwise a selected group of users.

The search and index module 218 can enable search and feed functionality. The search and index module 218 can allow free text searches. The search and index module 218 also can handle the indexing and searching of data.

The backend server 220 can run jobs to collate data for future reporting. The jobs run by the backend server 220 do not interfere with other operations of the social shopping system 202. Large number of users connected to the social shopping system 202 through an associated website or client application are not affected.

The worker queue 222 can process background calculations and reports and ensure that synchronous responses are fast.

The storage 224 is a number of stores that store information in the database. Storage stores information such as user data, credentials, shop information, groups, catalog, art images, and file information. In some embodiments, various stores of the storage 224 can be maintained by the database 210.

The credentials module 226 can allow the users to identify their credentials, create product connections, share such product connections with friends, like and provide kudos to such product connections if the users wish, review product connections, see product connections of other users, and become rock stars to the social shopping system 202. The credentials module 226 is discussed in more detail herein.

The search module 228 can allow the user to find product connections from categories of product connections or a search box. The social shopping system 202 can support various categories of product connections. For example, the categories may include a category for animals or a category for design. If a user selects a category, all product connections for the category may be displayed for the user. The search box is a field in which a user may type a search term and, in response, the search module 228 can provide an output based on the search term. The search module 228 also can allow the user to find hashtags and users through tags. For example, a user can use a format, such as #hashtag and @user, to find information based on hashtags and usernames.

The cruise module 230 can allow the user to browse, explore, and discover product connections that are popular within the social shopping system 202. The cruise module 230 can allow the user to find product connections that are favorites. The cruise module 230 can allow the user to see product connections that are recommended specifically for the user within the social shopping system 202.

The groups module 232 can allow the user to join groups and participate in groups. The groups module 232 can allow the user to see the groups that he belongs to. The groups module 232 can allow the user to browse popular groups, favorite groups, and similar groups. The groups module 232 also can suggest groups for the user.

The shop module 234 can allow the user to purchase products and/or services by clicking on an item and checking out via a merchant website. The shop module 234 can allow the user to discover popular items, favorite items, and items that are specifically recommended to the user. The shop module 234 also can allow the user to save items that the user likes. The shop module 234 can allow the user to save user shopping information, such as personal information and financial information, and thus allow for an efficient check out.

Figure 3:
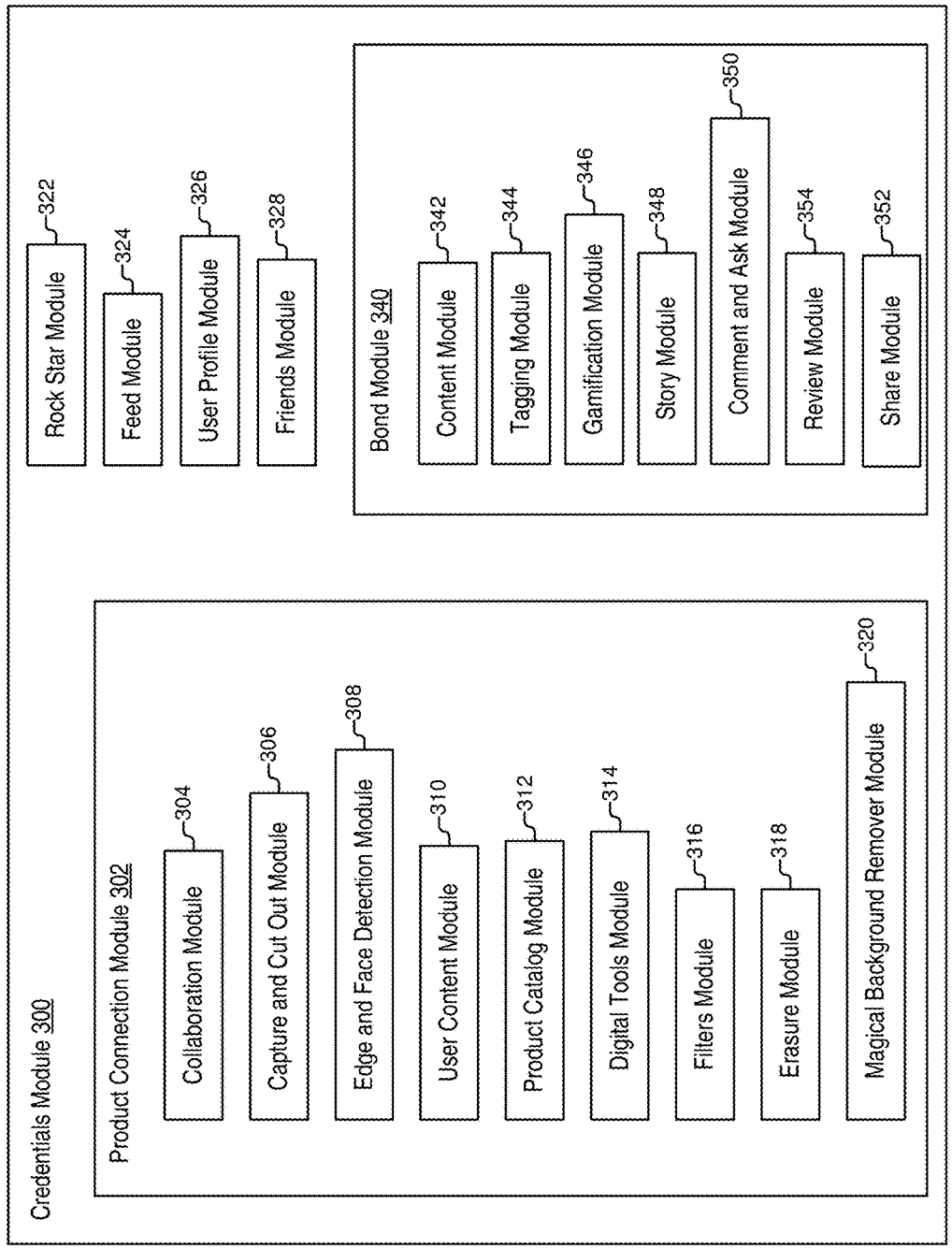
FIG. 3 illustrates an example credentials module, in accordance with an embodiment of the present disclosure.

FIG. 3 shows an example credentials module 300, in accordance with some embodiments of the present disclosure. In an embodiment, the credentials module 226 can be implemented with the credentials module 226. The credentials module 300 can include a product connection module 302, a rock star module 322, a feed module 324, a user profile module 326, a friends module 328, and a bond module 340.

The credentials module 300 may allow the user to identify the user's credentials on his profile page. By identifying his credentials, other users will be able to discover his strengths and discover the product connections he created based on his credentials.

The credentials module 300 allows the user to create product connections based on his credentials. The credentials module 300 can allow the user to interact with other users regarding his product connection, whether it is telling a story, tagging a friend, allowing others to like his product connection or giving him a kudo, discussing the product connection with others, sharing his product connection within or outside the social shopping system 102, reviewing a product connection, or answering a question.

The credentials module 300 allows users to interact with the social shopping system 102 In some instances, if the credentials of a user is sufficiently high (e.g., satisfies a threshold regarding likes, kudos, comments, product connections, etc.), a user can be considered a power user (or "rock star") of the social shopping system 102. The credentials module 300 can provide users with feed of activity of their friends. The credentials module 300 can allow other users to see a profile page of a user and discover his credentials and respective product connections. The credentials module 300 allows a user to connect and engage with other users.

The credentials module 300 can interact with the web server 204 to render web pages on the client 250 that provide certain information to the user and prompt the user to, in turn, provide certain information to the social shopping system 102. The credentials module 300 can interact with the backend server 220 through an API. The credentials module 300 can determine a credential for a user based on the subject matter reflected in product connections created by the user. For instance, "Billiards" may be determined to be a credential of the user based on product connections relating to billiards created by the user. A credential can be associated with a name or username of a user and can be shareable across social networking systems, such as Facebook, Twitter, Google+, etc. A credential can also be determined by users themselves, as discussed herein.

The credentials module 300 can provide certain information to users regarding product connections. For example, the credentials module 300 can provide to users all of the published credentials and their associated product connections so that other users can view and discover the product connections. The users can be presented with the following information about each product connection: the name of credential, the name of the user who created the product connection, the title of the product connection, the images of the product connection and their applicable links (if any), comments and questions associated with the product connection (if any), likes and kudos associated with the product connection (if any), and an embedded link associated with the product connection for sharing with other users of the social shopping system 102, any of the social media websites 280, or other entities.

The credentials module 300 can provide various tools implemented by other modules for the user to create a product connection. The credentials module 300 can also provide a feed to the user and profile pages of users of the social shopping system 102. The credentials module 300 can provide the credentials and product connections to different modules of the social shopping system 102 to carry out the functions of the social shopping system 102.

The credentials module 300 can manage certain information relating to a user's credentials. In some instances, credentials can reflect star ratings on a profile of the user, a number of kudos that the user may have earned, a number of likes that the user may have earned, how many product connections (or bonds) have been created by the user, questions or reviews in relation to product connections, etc. In some instances, credentials may be associated with a user in general across all of the activities of the user on the social shopping system 102. In some instances, credentials may also be associated with a particular product connection created by a user Such information can be used in the creation and sharing of a product connection, as discussed in more detail herein.

The credentials module 300 can allow a user to share his credentials and product connections with other users, browse and discover credentials of other users and their respective product connections, create new product connections, engage with other users regarding a product connection, and shop for products and/or services.

In an embodiment, the credentials module 300 can allow credentials to be created by users by grouping product connections. Other users can comment on the product connections, follow them, give kudos, ask questions, provide a review, and otherwise interact with the product connection and the users who created the product connections. Information regarding such interaction can be maintained in the database 210.

In an embodiment, credentials can be stored in a NoSQL DB as references to their respective product connections. In some embodiments, credentials can be references to a set of product connections and there need not be any credential object in the database 210.

Users of the social shopping system 102 can shop efficiently by discovering which products and/or services connect well with each other because a user may recommend products and/or services that go well with each other based on his credentials. In an embodiment, the product connection module 302 can allow a user to recommend products and/or services or groups of products and/or services based on his credentials by creating a product connection. When the credentials of a user are high with respect to a subject matter or category of product connections, the product connections of the user in the subject matter or category likely will attract more interest from other users. The product connection module 302 can include a collaboration module 304, a capture and cutout module 306, edge and face detection module 308, user content module 310, product catalog module 312, digital tools module 314, filters module 316, erasure module 318, and magical background remover module 320.

The product connection module 302 can interact with other modules of the social shopping system 102 by providing to the other modules, for example, images of products and/or services, user generated information related to a product connection, such as likes, kudos, comments, etc. The product connection module 302 can also provide information on image placement and image geometry with respect to a product connection to the social shopping system 102 so that the product connection can be created and presented precisely as designed.

The product connection module 302 can provide information and resources to a user including but not limited to:

a) It can provide a product catalog that the user can view, obtain, and use to recommend a group of products and/or services that go well with each other.

b) It can provide a place where users can clip images from the web or upload their own images via the user content module 310.

c) It provides digital tools via the digital tools module 314 that allow the user to create a product connection of products and/or services or collaborate with one another.

The product connection module 302 can request a user to express his ability to pair, associate, relate, or otherwise connect products and/or services. The user can provide the following information or perform the following action to create a product connection for a particular credential: the name of the credential, the title of the product connection, a category of the product connection, a privacy setting for the product connection, a template for the product connection, selection of images, video and/or other media for the product connection, a story for the product connection, utilization of tools to enhance the product connection if desired, and specification of whether a product connection should be published, saved, or cancelled. The user can choose to collaborate with two or more people in the creation of a product connection, as discussed in more detail herein.

The product connection module 302 can allow the user to create a product connection for a particular credential. The user can create a product connection to represent a collection of products and/or services. For instance, the user can create a product connection including a pool stick, a bag, and a pair of gloves for his credential of "Billiards." The user can pick these items from a product catalog via the product catalog module 312 or from a content page associated with the user via the user content module 310. The user can enhance the product connection using the digital tools module 314 and other modules of the social shopping system 102. The user can publish the product connection, which can be referred to as a "bond." A bond can be a product connection composed of various media including text, products, and/or services reflecting the user's creativity and/or expression of the user's flair within the social shopping system 102. Others users, such as followers of the user who created the product connection, can see and discover the product connection and, based on links associated with some or all of the products and/or services, navigate to websites of each merchant associated with the products and/or services to place orders for such products and/or services. Information related to interactions of users with the product connections can be captured in the database 210 for further processing or reporting. In an embodiment, the information can be maintained in a series of documents under a NoSQL database to be consumed later in the form of reports.

The user content module 310 can allow a user to bookmark web pages to be used as elements of a product connection. The element can include images, videos, and other media. The user content module 310 can also allow users to upload their images and/or other media to be used as part of a product connection.

The product catalog module 312 of the social shopping system 102 can store images, clip art, fonts, etc. in a product catalog. The product catalog module 312 can allow products and/or services to be used as part of a product connection. Users with business accounts may submit their products and/or services to the product catalog. The products and/or services in the product catalog may contain products and/or services from affiliate partners.

The digital tools module 314 can include tools to import product data and images. The digital tools module 314 can provide to a user a drag and drop tool to drag an image to a canvas to create an immersive experience by creating a product connection. The digital tools module 314 can include other image manipulation tools that can be used in the creation of a product connection.

The filters module 316 can apply a filter on an image that is selected by a user. Such filters can alter the appearance of an image for, for example, aesthetic or functional purposes. The tool scripts module 208 can allow a user to perform specific functions to a product connection including, without limitation, placing words on the product connection using a text tool or placing a filter on the image using a tool that can be controlled by the user and that interacts with the filters module 316.

The magical background remover module 320 can allow a user to select an area in an image to be removed. The magical background remover module 320 can automatically remove a background or other portion of the selected area in an image.

The edge and face detection module 308 can allow a user to detect the edge and faces of an image.

The collaboration module 304, the capture and cutout module 306, and the erasure module 318 are discussed in more detail herein.

Figure 9A:
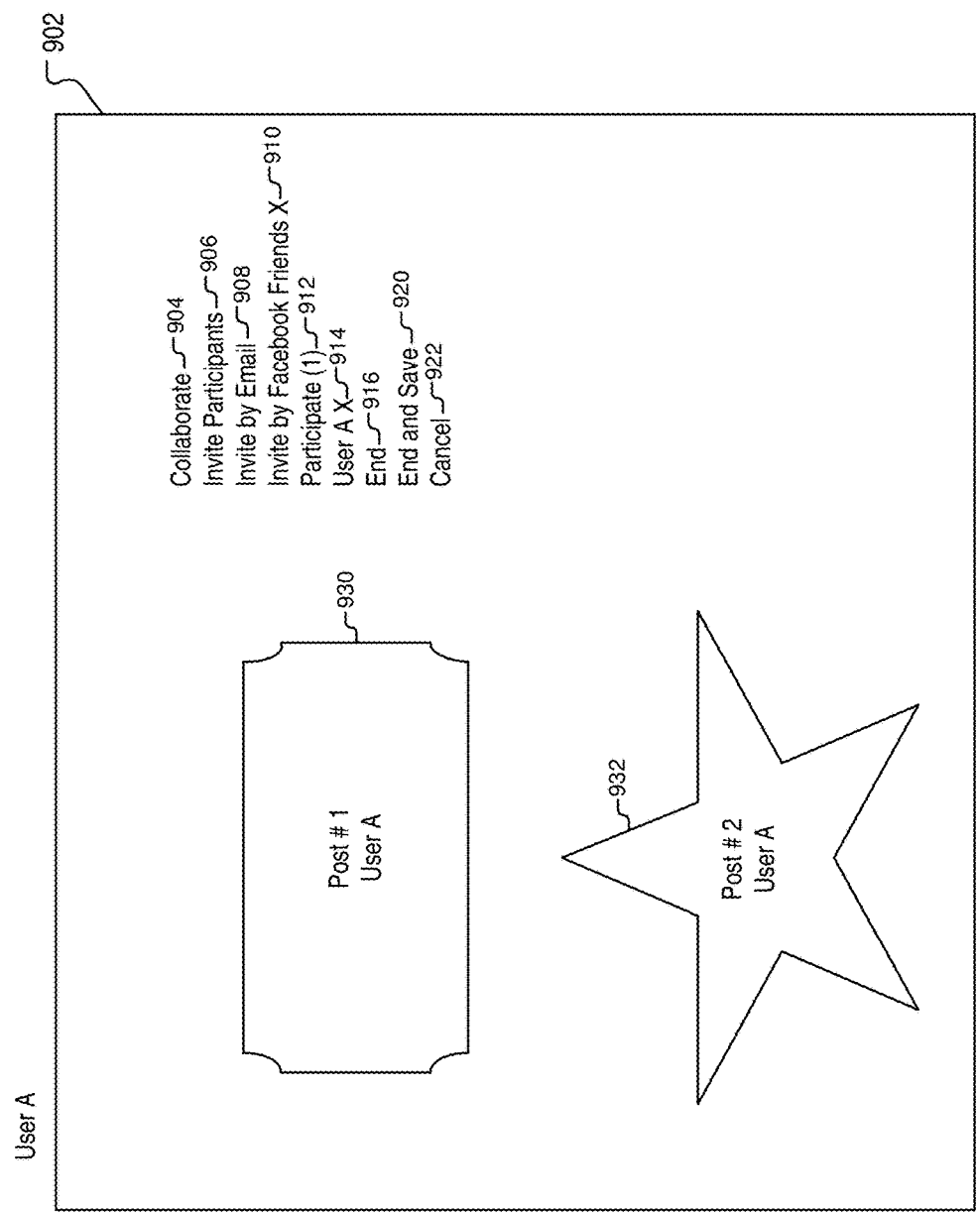
FIGS. 9A-9F illustrate example user interfaces supported by an example collaboration module, in accordance with an embodiment of the present disclosure.
Figure 9B:
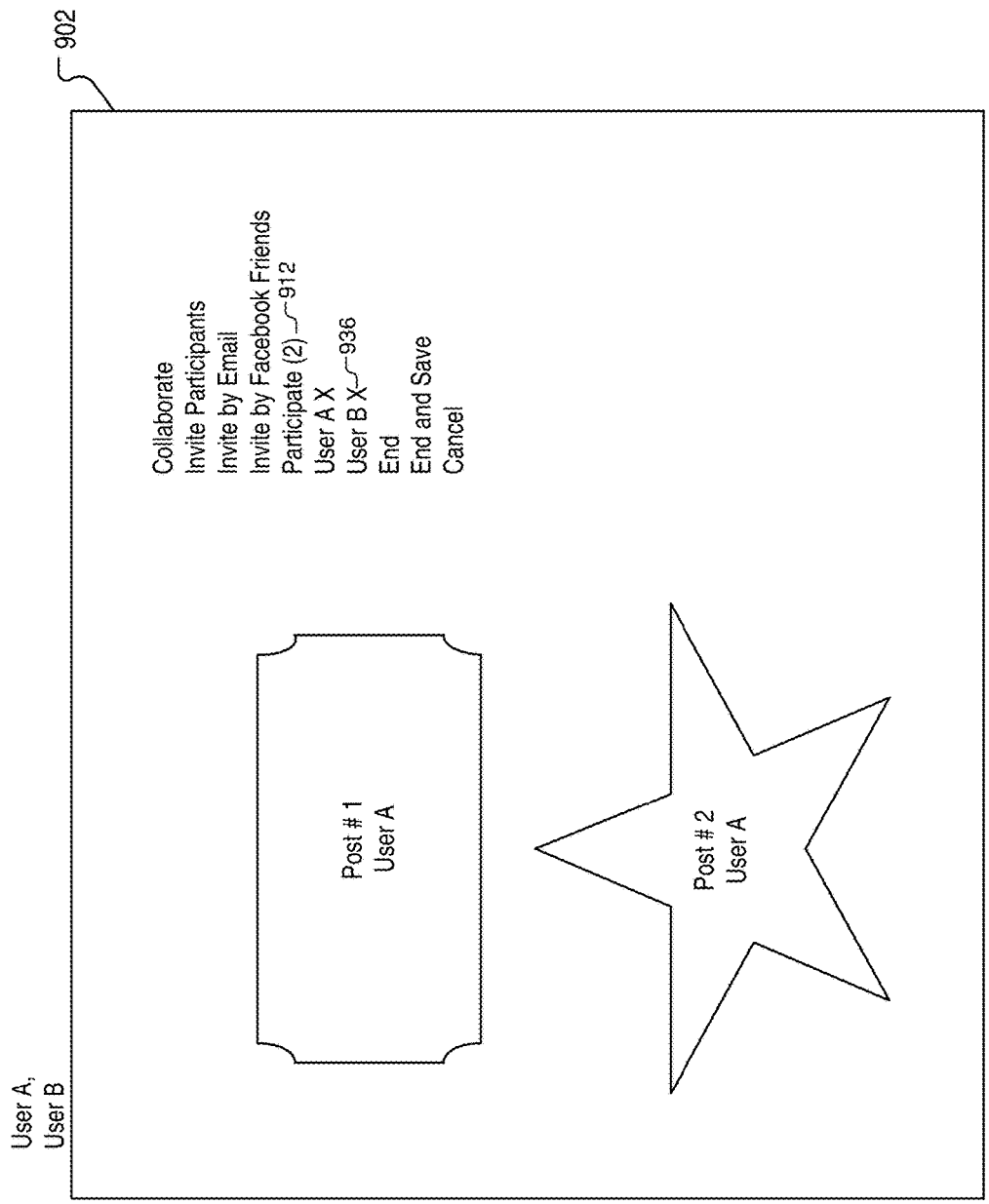
Figure 9C:
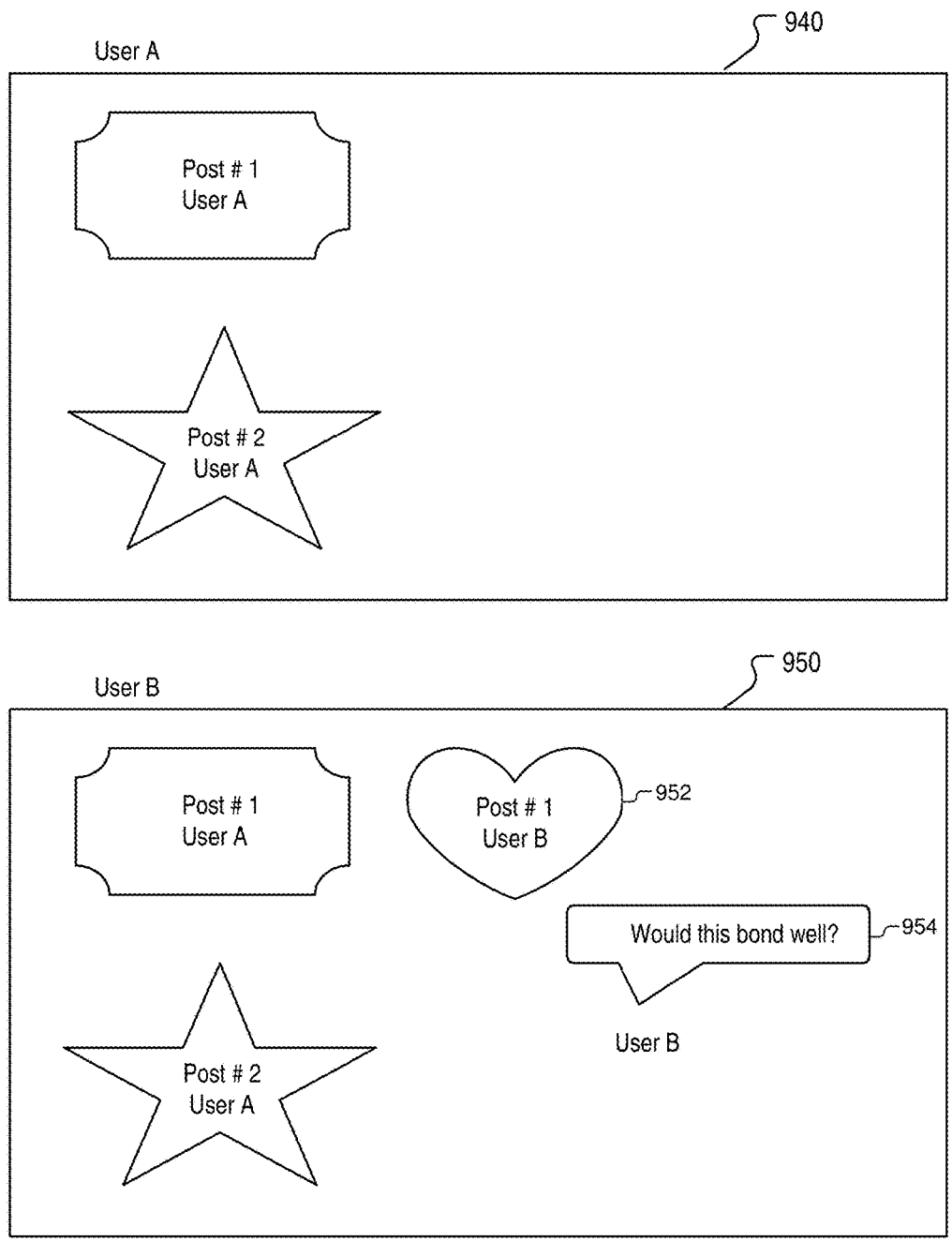
Figure 9D:
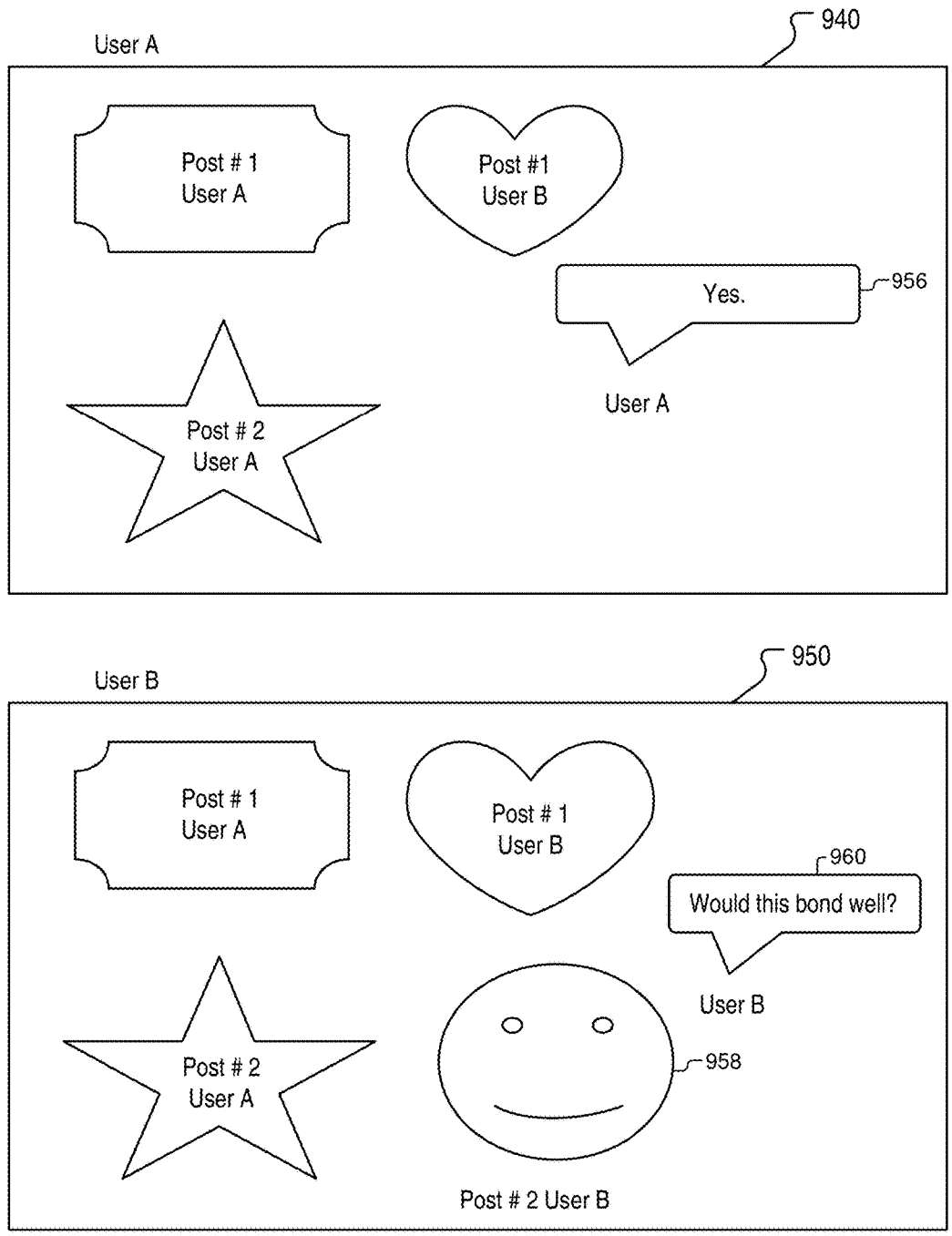
Figure 9E:
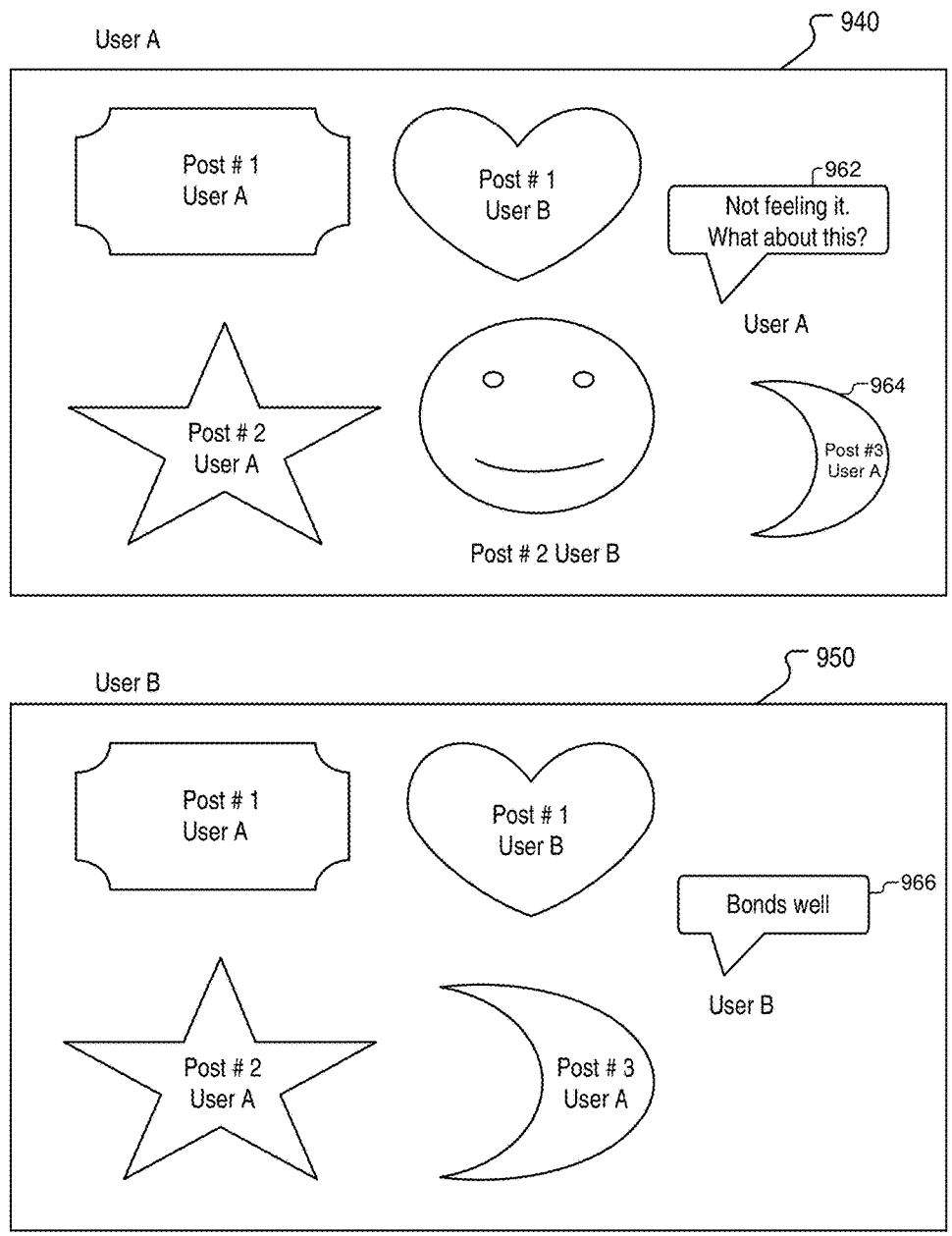
Figure 9F:
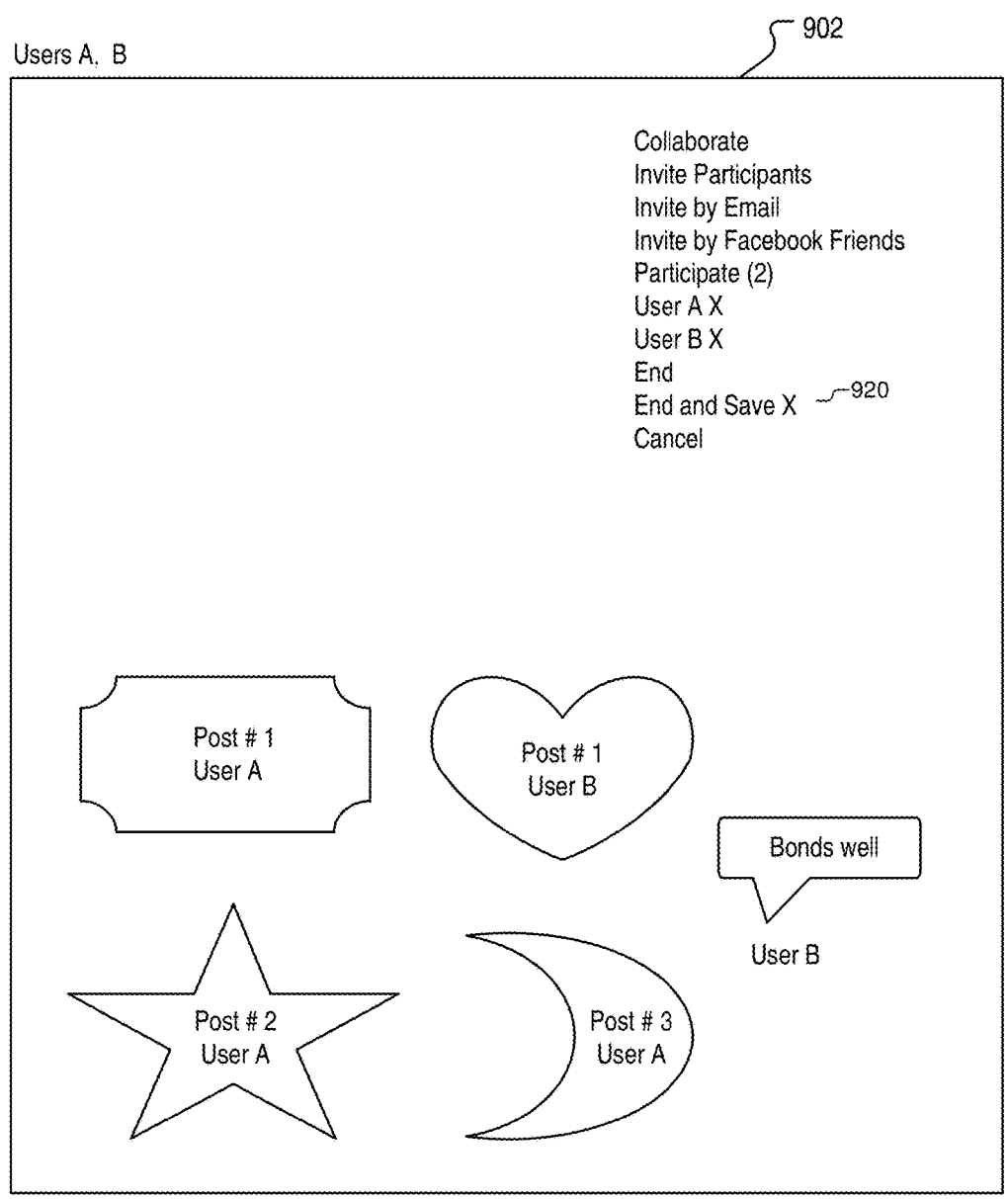
Figure 10:
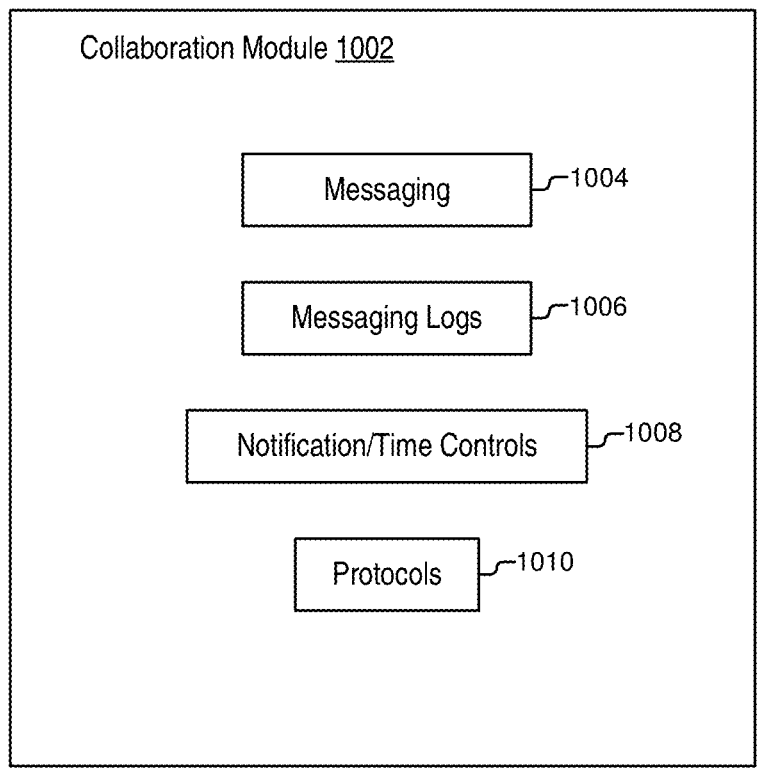
FIG. 10 illustrates an example collaboration module, in accordance with an embodiment of the present disclosure.

FIG. 10 shows an example collaboration module 1002 and FIGS. 9A-9F show related example functionality as reflected by simplified user interfaces, in accordance with some embodiments of the present disclosure. In an embodiment, the collaboration module 304 can be implemented with the collaboration module 1002. The collaboration module 1002 can enable users to collaborate with two or more people to create a product connection. The collaboration module 1002 also can manage collaboration among users to create better product connections. The collaboration module 1002 can control, for example, the number of participants in collaboration with one another, the time of collaboration, and the content and frequency of collaboration regarding a product connection. Such control can facilitate collaboration of users with the social shopping system 102 and encourage the creation of product connections. The collaboration module 1002 can allow a user to collaborate with one or more other users at any time from any place.

For example, any number of users can collaborate on a product connection. The number of users can be controlled by the collaboration module 1002, a creator of the product connection, other approved collaborators on the product connection, or any combination thereof.

For example, the time of collaboration can be determined by a creator of a product connection. The time of collaboration can be, for example, a maximum (or minimum) amount of time (e.g., six hours, one day, three weeks, etc.). The amount of time can be continuous time or various intervals (sessions) of time that can be summed together to satisfy the designated maximum or minimum time.

For example, the collaboration module 1002 or a creator of a product connection can employ various image recognition techniques to control the content to be included in the product connection. If, for example, an image associated with an element proposed for inclusion in a product connection is determined to be irrelevant to the product connection or category with which the product connection is associated, then the collaboration module 1002 may restrict inclusion of the image in the product connection.

For example, the collaboration module 1002 can allow a creator of a product connection to specify how often online collaboration will be permitted for the product connection. In one instance, the creator of the product connection can specify that sessions of collaboration for the product connection should not take exceed a certain frequency (e.g., once per day, once per week, etc.). In another instance, the creator of the product connection can specify that input from a collaborator should not exceed a certain frequency.

Such control by the collaboration module 1002 can be based on an input applied by a user to an associated computing device, or a browser or application running thereon The collaboration module 1002 can interact with the social shopping system 102 by proprietary protocol tunneled on an XMPP server. The web server along with web technologies, such as WebSocket, allow for asynchronous communication.

The collaboration module 1002 can manage communications among users. For example, the collaboration module 1002 can allow a user to send an invitation to other users, select a time to message other users, message other users, etc. For example, the collaboration module 1002 can perform the following actions based on instructions provided by the user:

a) Invite two or more users to collaborate on the creation of a product connection b) Provide a timeline for other users to accept and respond to invitations to collaborate c) Post products and/or services using the product connection module 302 to allow other users to provide feedback on the products and/or services d) Communicate with participants in a collaboration by sending messages regarding approvals or disapprovals with respect to the creation of a product connection.

The collaboration module 1002 can allow a user to send an invitation to another user via a real time notification service upon a determination that the other user is present. If the other user is not available or logged into the social shopping system 102, the collaboration module 1002 can provide an email or other communication to the user. Further, the collaboration module 1002 can provide real time or near real time collaboration between or among users to create a product connection.

The collaboration module 1002 can allow a screen of a user interface provided by the social shopping system 102 to be shared among many users during collaboration. A shared screen can facilitate collaboration among the users in the creation of a product connection. The shared screen can be updated to display current information that reflects the development of a product connection during collaboration. In an embodiment, the provision of a shared interactive screen allows the participants to see the recommended products and/or services in real time (or near real time) or at a later time.

The collaboration module 1002 can allow the user to select participants for collaboration and to select a period of time for participants to respond to a collaboration request. The collaboration module 1002 can enforce the selected period of time such that users must timely respond or thereafter forego the opportunity to participate in collaboration. Because an initial user can set a specified amount of time, it motivates participants to respond and collaborate within the specified amount of time in order for the participants' recommendations to be included in the product connection.

In an embodiment, the collaboration module 1002 can allow a user to post products and/or services to allow the participant(s) to view the recommended products and/or services. The collaboration module 1002 can allow the user to search for other products and/or services that go well with the recommended products and/or services based on the user's flair.

The collaboration module 1002 can allow a user to communicate with the participants by sending messages regarding their approval or disapproval with respect to adding to, removing from, or otherwise developing a product connection. The communication among the participants can foster creativity, sharing, and engagement. Collaboration enabled by the collaboration module 1002 can create a well thought out recommended set of products and/or services that allow other users to shop more efficiently as they learn which products and/or services go well together. For example, a product connection created from collaboration may tell a heartwarming story, thus provoking greater interest and engagement among various users of the social shopping system 102.

The collaboration module 1002 can include a messaging module 1004, messaging logs 1006, notification/time controls 1008, and protocols 1010.

The messaging module 1004 can enable a scalable, real time infrastructure to allow messaging among users for collaboration in connection with their use of the social shopping system 102. The messaging module 1004 can enable communications between a user and other users by opening virtual connections among them. The messaging logs 1006 can maintain a record of messages communicated among users. The messaging logs 1006 can be used to publish a history of communications among users to facilitate collaboration.

The notification/time controls 1008 can provide notifications to users at selected times. The notification/time controls 1008 can include transactional information such as the category and type of notifications sent to a user, as well as the activities that prompt provision of the notifications. The notification/time controls 1008 can allow a user to select the timing of communications by providing to the user various timeslots during which the other user can be contacted. The notification/time controls 1008 can create notification logs. A notification log may maintain information regarding the date and time the notifications are provided to a user. In an embodiment, the notification log may be implemented as a database table.

The protocols 1010 can enable real time communication among multiple clients 250 associated with users of the social shopping system 102.

FIGS. 9A-9F show simplified, example user interfaces reflecting functionality that can supported by the collaboration module 1002, in accordance with some embodiments of the present disclosure. The user interfaces can be displayed by computing devices associated with users of the social shopping system 102.

In FIG. 9A, a variety of items and indications can be presented in a user interface 902 to allow a user to collaborate with other users in creating a product connection. Upon selection by the user, an item 904 can initiate collaboration with other users. An item 906 can allow the user to send a collaboration invitation to another user (or participant) regarding a product connection. An item 908 can allow the user to send an invitation to a potential participant via e-mail and an item 910 can allow the user to send an invitation to a potential participant via another online communication medium, such as a social networking system (e.g., Facebook Friends). An indication 912 can indicate how many users are involved in the collaboration. An indication 914 can identify the users involved in the collaboration. An item 916 can allow the user to terminate a collaboration. An item 920 can allow the user to terminate a collaboration and save a product connection created by the collaboration. An item 922 can allow the user to cancel the product connection created by the collaboration. In addition, the collaboration module 1002 can present items in the user interface 902 to allow the user to select privacy settings for the product connection, and a name and a category for the product connection. Further, the collaboration module 1002 can provide to the user an option to allow the user to publish the product connection upon finalization. Other functionality can be presented in the user interface 902 to allow the user to manage collaboration in creation of product connections.

As shown in the user interface 902, a user "User A" has posted a post 930 and a post 932 for possible inclusion in a product connection. The post 930 and the post 932 can be a post of any type, such as an image, video, audio, text, a link to other content, etc. The post 930 and the post 932 can be of any desired or suitable form or appearance in terms of size, color, prominence, etc. The post 930 and the post 932 can relate to any topic or subject matter desired by the user.

As shown in FIG. 9B, a new participant "User B" has joined the collaboration initiated by User A. User B may have joined the collaboration by an invitation resulting from the selection by User A of the item 908 or the item 910. The option 912 accordingly reflects two participants in the collaboration. An indication 936 reflects the participation of User B.

FIG. 9C includes a simplified interactive screen 940 presented to User A and a simplified interactive screen 950 presented to User B. The screen 940 reflects two posts made by User A. The screen 950 reflects a new post 952 made by User B during the collaboration with User A. The screen 950 also reflects a message 954 sent by User B to User A requesting User A's feedback on whether the post 952 is desirable. As shown in FIG. 9D, the screen 940 reflects User A's feedback in the form of a message 956 that the post 952 is desirable. The screen 950 reflects another post 958 made by User B and a message 960 sent by User B to User A requesting User A's feedback on whether the post 958 is desirable. As shown in FIG. 9E, the screen 940 reflects User A's feedback in the form of a message 962 that the post 958 is not desirable. The message 962 further requests User B's feedback on the desirability of a new post 964. The screen 950 reflects User B's feedback in the form of message 966 that the post 964 is desirable. As shown in FIG. 9F, the user interface 902 displays all of the posts constituting the product connection created through the collaboration of User A and User B. The user interface 902 may be presented to both User A and User B. Selection by User A or User B of the item 920, as shown, can cause the product connection to be saved for publication to users of the social shopping system 102.

Figure 11:
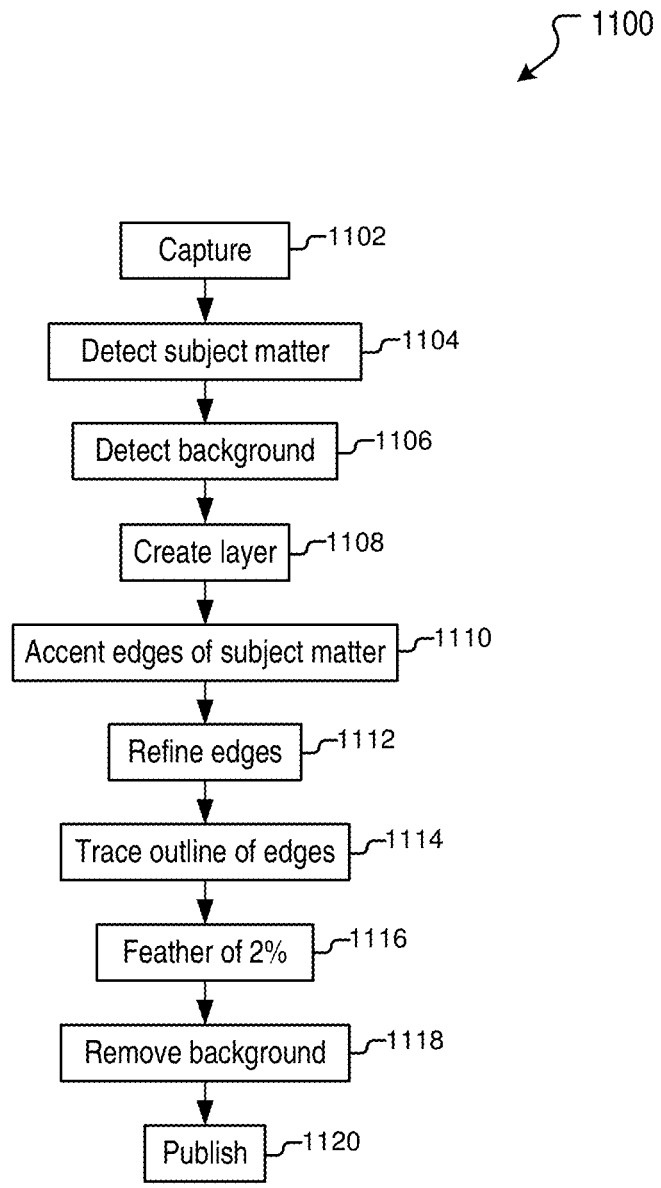
FIG. 11 illustrates an example method, in accordance with an embodiment of the present disclosure.

FIG. 11 is an example method that can be performed by the capture and cutout module 306, in accordance with some embodiments of the present disclosure. The capture and cutout module 306 is a tool that allows a user to erase parts of an image. The capture and cutout module 306 can provide a user with an application to detect the subject matter and background and provide a cutout image for the user. The capture and cutout module 306 allows a user to capture images from mobile and other devices, cutout the background of the images, and post them with the social shopping system 102 for potential inclusion in a product connection. In some embodiments, the capture and cutout module 306 can be a server side and/or client side library and code that operates on objects in HTML5 canvas.

At block 1102, the capture and cutout module 306 requests the user to capture an image. At block 1104, the capture and cutout module 306 detects the subject matter of the image. At block 1106, the capture and cutout module 306 detects the background of the image. At block 1108, the capture and cutout module 306 creates a duplicate layer of the original image and copies the original image (it creates a second layer of the original image and copies the original image onto the second layer). At block 1110, using the duplicate image, the capture and cutout module 306 accents edges of the subject matter. With the second image, it makes the edges bolder and easier to find. At block 1112, the capture and cutout module 306 refines edges so that it is clear where the edges are. At block 1114, the capture and cutout module 306 traces the outline of the edges. At block 1116, the capture and cutout module 306 feathers the edges at 2% or other suitable value. The edges of the image are smoothed so that the lines will be more smooth after the cutout. At block 1118, the capture and cutout module 306 removes the background of the image. At block 1120, the capture and cutout module 306 provides the edited image to the social shopping system 102.

Figure 12:
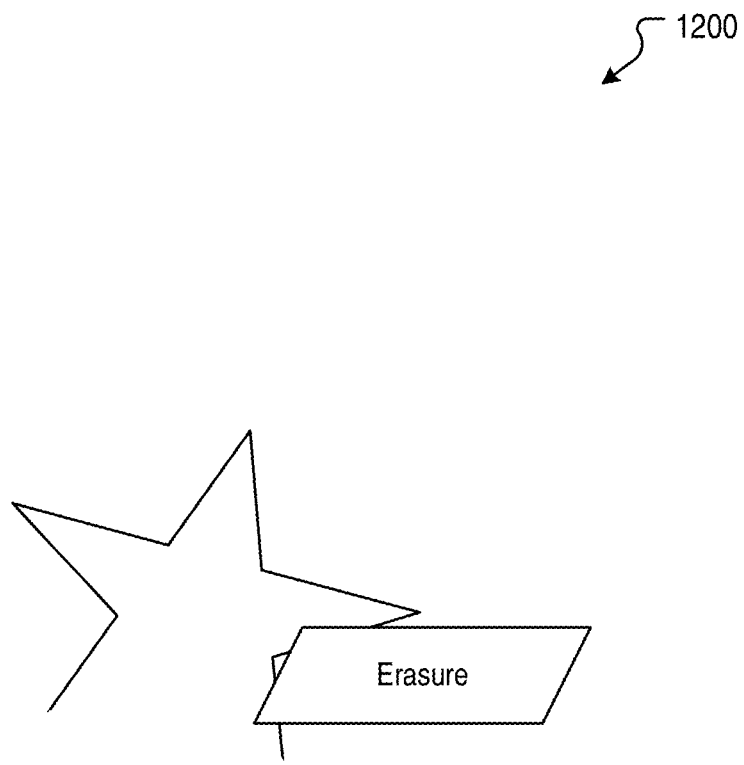
FIG. 12 illustrates an example user interface supported by an erasure module, in accordance with an embodiment of the present disclosure.

FIG. 12 shows a simplified, example user interface 1200 reflecting functionality that can be supported by the erasure module 318, in accordance with some embodiments of the present disclosure. The erasure module 318 can allow a user to erase unwanted pixels in an image or a product connection. The erasure module 318 can be used in addition to the magical background remover module 320, the capture and cutout module 306, or other functionality that allows a user to remove some or all of an image or product connection. The functionality of the erasure module 318 can be a vital tool for a user when, for example, automatic cutout capabilities fail to remove white space, unwanted pixels, or noise, particularly when other tools fail to remove the entire background or undesirably leave residues.

For instance, an image can include a white background and a pool stick. A user can use the functionality of the magical background remover module 320 to remove the white background. However, such use of the magical background remover module 320 may have resulted in an image with the pool stick appearing with grains of white residue from the original image. The erasure module 318 can allow the user to erase the white residue and refine the image.

The erasure module 318 can be part of a studio tool provided by the social shopping system 102. The erasure module 318 can be implemented by a server side and/or client side library and code that operates on objects in HTML5 canvas. In some embodiments, the erasure module 318 can provide an erasure button for presentation to a user. The erasure module 318 can allow the user to use the erasure button to erase pixels and other information in an image or product connection. For example, to erase pixels and information in a product connection in a designated area, the user can mark the designated area and click the erase button.

With respect to FIG. 3, the bond module 340 can allow a user to create a product connection based on his credentials. When a product connection is published, it may be called a "bond". Users may write comments for each bond. Bonds can be promoted based on likes, kudos, comments, stories, and reviews. The more likes, kudos, comments, and reviews for a bond, the more popular the bond and the more validated a user who created the bond is based on his credentials. A quantitative or qualitative measure of validation of the credentials of the user, or a quantitative or qualitative measure of the credentials of the user, can be based on the amount of likes, kudos, comments, and reviews for a bond. Users can also collaborate online to create stronger bonds via the product connection module 302. The user may comment on each bond, group the bonds together into a credential, and share the bond on social networks. The bond module 340 can include a content module 342, a tagging module 344, a gamification module 346, a story module 348, a comment and ask module 350, a review module 354, and a share module 352.

The content module 342 can present images, video, and other media that may constitute a part or whole of a product connection that may be published as a bond. In some instances, the content module 342 can present media in a 3D form for presentation to users.

In some instances the content module 342 can provide video capabilities. The content module 342 can include a video uploader, a video transcoder, and a video player. The content module 342 can interact with other modules of the social shopping system 102 to allow uploading of videos by chunking the videos and transcoding the videos to multiple formats so they are playable on different client platforms (end points) such as mobile, web, and desktops. The content module 342 can provide a user with a selection of videos to place into a product connection. The content module 342 can request that a user select a video to be used. The user can select a video from a catalog to place into a product connection.

The content module 342 also can allow content selected by a user for inclusion in a product connection to be dragged from a client device (e.g., desktop) and dropped into a content page associated with the user via the user content module 254. The content module 342 can also store selected content, such as videos. In some embodiments, limited length videos (max 10 MB) can be uploaded directly to a backend file system or optionally Amazon S3 and linked through metadata stored in a NoSQL database.

The tagging module 344 can allow a user to tag other users within the social shopping system 102. The tagging module 344 can allow the user to tag the bond with himself, a particular user, and/or a group of other users.

The gamification module 346 can allow users to like a bond, give kudos to a bond, and rate a user based on his bonds. Based on the number of likes, kudos, reviews, and the user's rating, the user's bond may become popular, a favorite, or recommended by the social shopping system 102 to another user. The gamification module 346 can allow other users to determine who has the best bonds based on the user's credentials. The gamification module 346 also can validate the user's credentials and encourage the user to recommend the best product connections of products and/or services based on his credentials.

The story module 348 can allow a user to tell a story about a product connection that he has created. For instance, if his bond includes a pool stick, a bag and a pair of gloves, his story may be that he discovered the best shaft for his pool stick or that his pair of gloves does not produce friction compared to shooting a ball with his bare hands. If his bond includes a pool hall, his favorite beer, his lucky table, and a group of friends, his story may be that he always has fun at a particular pool hall or his glass of Blue Moon branded beer is exceptionally good or he plays exceptionally well with a particular group of friends. The story module 348 can allow users to learn the context of a product connection and can provide the users with details about the products and/or services for potential sharing with others. The story module 348 can create intimacy and enhance relationships within the social shopping system 102.

The comment and ask module 350 can allow users to comment about a product connection or ask questions about a product connection and its corresponding products and/or services. The comment and ask module 350 can allow a user to answer questions about his product connection and can share further knowledge and details about the products and/or services. The comment and ask module 350 allows the credentials of a user to be validated when the user's response is deemed helpful by other users and when he provides relevant information about the products and/or services. Based on the user's comments and response to questions, other users in the social shopping system 102 may provide a high rating to the user, thus elevating the user's credibility.

The review module 354 can allow users to provide reviews about a product connection and its respective products and/or services contained in a bond. The review module 354 can allow other users to provide honest feedback about a product connection and can share further knowledge and details about the associated products and/or services. The review module 354 can provide an external validation when a user's bond is helpful and his product connection of products and/or services is valued by other users.

The share module 352 can allow users to share the product connection anywhere where an embedded link can be shared. For example, the share module 352 can associate a link, code, or other identifier for a product connection. The link, code, or other identifier for the product connection can be used by users, such as a creator of the product connection or fans of the product connection, to display the product connection in web pages administered by systems other than the social shopping system 102. The share module 352 also can allow users to share the product connection with social media websites, such as Twitter, Google+, Facebook, etc.

The user profile module 326 can allow a user to identify his credentials on a profile page. The user profile module 326 can provide a user tools to input information about the user, such as a list of his credentials, where he is located, and other information. The user profile module 326 can allow a user to see how many likes and kudos he has within the social shopping system 102. The user profile module 326 can allow a user to manage his credentials and respective product connections, and allows the user to delete product connections if desired. The user profile module 326 can present such information to other users in the form of a profile page to allow them to learn about the user, such as his credentials, the product connections that he has created, and his reviews.

The friends module 328 can allow a user to follow other users. By following other users, the user can see the activities of the other users via the feed module 324. The friends module 328 can allow a user to find friends, other users who have the same credentials as the user, and particular users with certain credentials. For example, if a user is a beginning pool player, the user may look for users who have the credential of "Billiards" so that the user can see their product connections to determine whether certain products and/or services are recommended or how the user can improve his billiards skill level.

The feed module 324 can produce a content feed for a user. The content feed can include product connections sorted based on rankings/ratings, likes, kudos, and closest connections of the user. The feed module 324 can manage and track information about activities of friends of the user. For example, the feed module 324 can provide status information posted by friends. Status information may include temporary information published by a friend of a user that reflects the current thoughts and expressions of the friend. By its nature, posted status information may change frequently and accordingly the feed module 324 can track such changes. As another example, the feed module 324 can also track information about flairs, collages, photos, videos, and other content posted by friends of the user. The feed module 324 and other modules of the social shopping system 102 can allow users to see a flair for each bond. The flairs of users can be indicated in users' profiles. The flairs can be searchable.

The feed module 324 can also track stories concerning friends of a user. Stories may include various actions taken by friends of a user in the social shopping system 102. For example, a story may involve one or more friends "liking" the product connection of another friend. As another example, a story may involve one or more friends "liking" the status of another friend. As yet another example, a story may involve the publication of a comment or sharing by a friend or friends of the user. In addition to the information described herein, other types of information about the social network of the user also may be tracked by the feed module 324.

The feed module 324 can include a social graph, a database, and a technology stack to support the functionality of the feed module 324. The feed module 324 can interact with other modules of the social shopping system 102 by creating relationships/associations among entities supported by the social shopping system 102 and using these relationships to support the feed. For example, the feed module 324 can create associations between different entities, such as a username of a user with new product connections of the user, a user with new friends of the user, etc. As another example, if a friend of a user has created a new bond, then the feed module 324 can present the new bond associated with the username of the friend in a feed of the user. The feed module 324 can allow users to see associations between various entities so the users have up to date information about all of the activities of their friends in connection with the social shopping system 102. The objects that are controlled by the feed module 324 may include product connections, likes, kudos, and comments. The feed module 324 can allow a user to write on the wall of a feed page or pages of user profiles.

The feed module 324 can allow a user to follow another user and activities of the user in connection with the social shopping system 102. The feed module 324 can allow a user to comment, post, and respond to comments in a feed of the user.

The feed module 324 can allow the user to view the activities in his network and can allow the user to engage with another user regarding a product connection. The feed module 324 can also allow a user to monitor and maintain information regarding other users followed by the user and can enable the user to see their feeds.

The rock star module 322 can manage interactions between the social shopping system 102 and users of the social shopping system 102 that have satisfied certain considerations or criteria (rock stars). Such considerations and criteria can be determined by the social shopping system 102. Rock stars can be eligible to receive certain benefits or advantages (e.g., payments, commissions, etc.) provided by the social shopping system 102 based on their involvement and activities with the social shopping system 102. The rock star module 322 can provide the following to a user who has been qualified as a rock star: an affiliate rock star account, a percentage of revenue, and affiliate information, such as a special affiliate code that is assigned to the user. Based on the rock star module 322, a user who qualifies as a rock star can set up and apply for a rock star account associated with an affiliate rock star program and earn commissions on sales of products and/or services from product connections of the user. The rock star module 322 can validate the user based on the user's admission into the affiliate rock star program. In addition, the rock star module 322 can track the user's revenue via a unique IDS, a special code unique to the rock star that can be used to track referrals and other information relating to the rock star.

Figure 13:
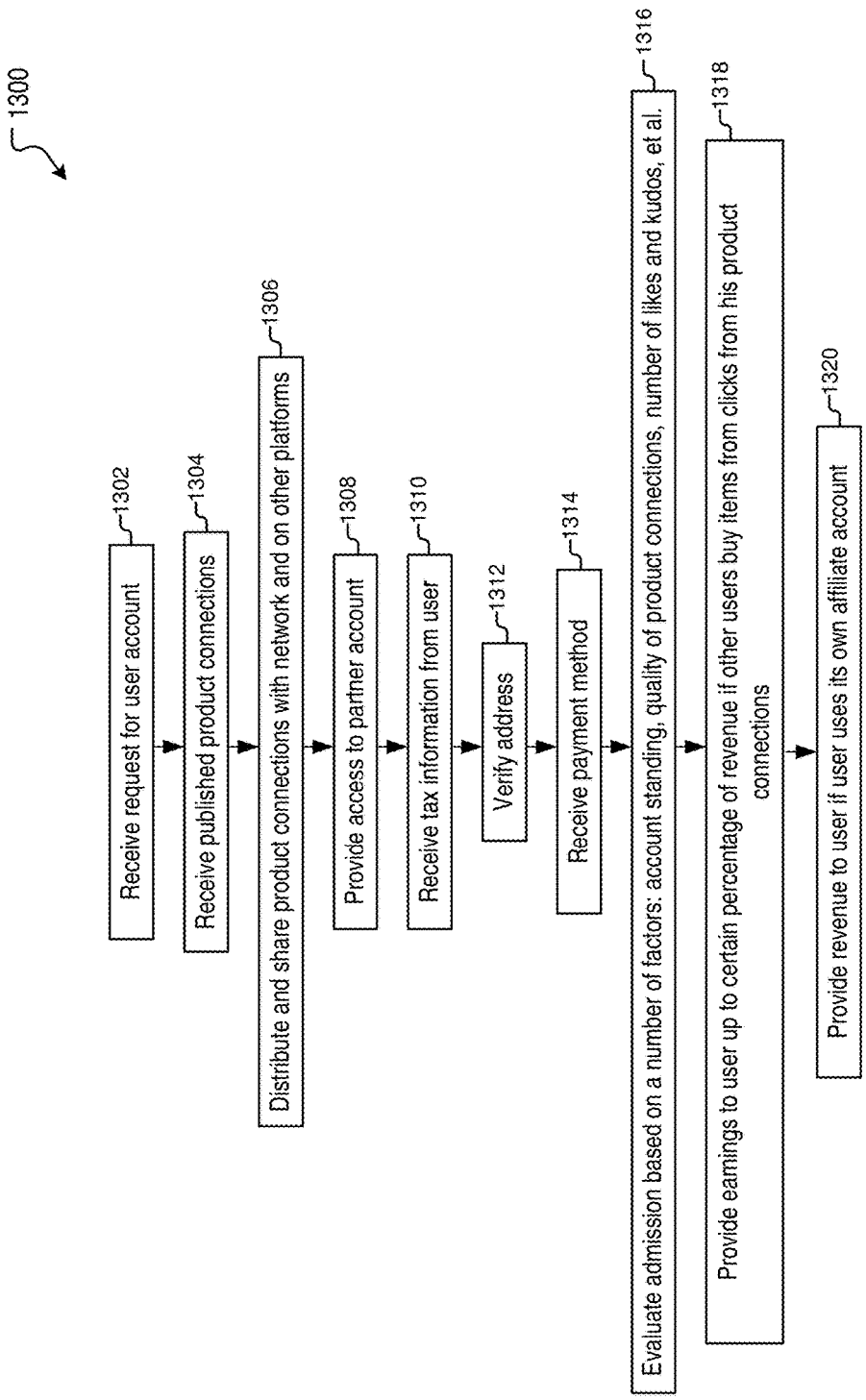
FIG. 13 illustrates an example method, in accordance with an embodiment of the present disclosure.

FIG. 13 is an example method 1300 that can be performed by the rock star module 322 and other modules of the social shopping system 102, in accordance with some embodiments of the present disclosure. The example method 1300 can provide a user with certain benefits (e.g., revenue) based on a revenue sharing program of the social shopping system 102. At block 1302, the method 1300 can receive a request from a user for the creation of a user account. At block 1304, the method 1300 can receive published product connections from the user. At block 1306, the method 1300 can distribute and share product connections with a network of the user and other platforms including social media websites. At block 1308, the method 1300 can provide access to an affiliate rock star account after the user applies for the affiliate rock star account and he has been validated and allowed to be a rock star of the social shopping system 102. Such validations can be maintained by the social shopping system 102. At blocks 1310-1314, the method 1300 can receive tax information from the user, verify his address, and receive the user's preferred payment method. This information can be maintained by the social shopping system 102. At block 1316, the method 1300 can evaluate the user's admission to rock star status based on a number of factors including, for example, his account standing, quality of product connections, number of likes and kudos, his rating, and other factors. At block 1318, the method 1300 can provide earnings to the user of up to a certain amount (e.g., 18%) of revenue if other users purchase items from his product connections. At block 1320, the method 1300 can provide revenue to the user as a rock star participating in the revenue sharing program.

A product connection can be created by a rock star, including an agent of the rock star. When a user of the social shopping system 102 purchases an element or an entirety of a product connection, the purchase can be tracked. The rock star module 322 can provide a special affiliate ID or code that can be used to track purchases, referrals, or other transactions relating to the product connection. Based on the special ID or code, the rock star module 322 can determine revenue generated from the product connection and portions of the revenue to be potentially paid to the rock star.

Figure 4:
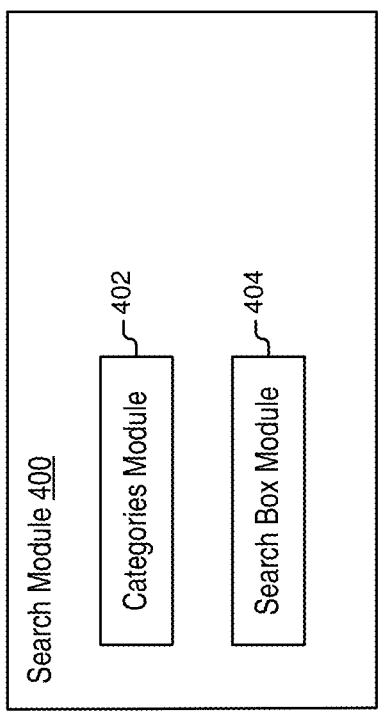
FIG. 4 illustrates an example search module, in accordance with an embodiment of the present disclosure.

FIG. 4 shows an example search module 400, in accordance with some embodiments of the present disclosure. The search module 400 can include a categories module 402 and a search box module 404. The categories module 402 can allow a user to search for product connections by selecting a category with which product connections may be associated. The search box module 404 can allow the user to search for product connections, users, groups, products and/or services and can provide other search capabilities based on search information entered by a user into a search field.

Figure 5:
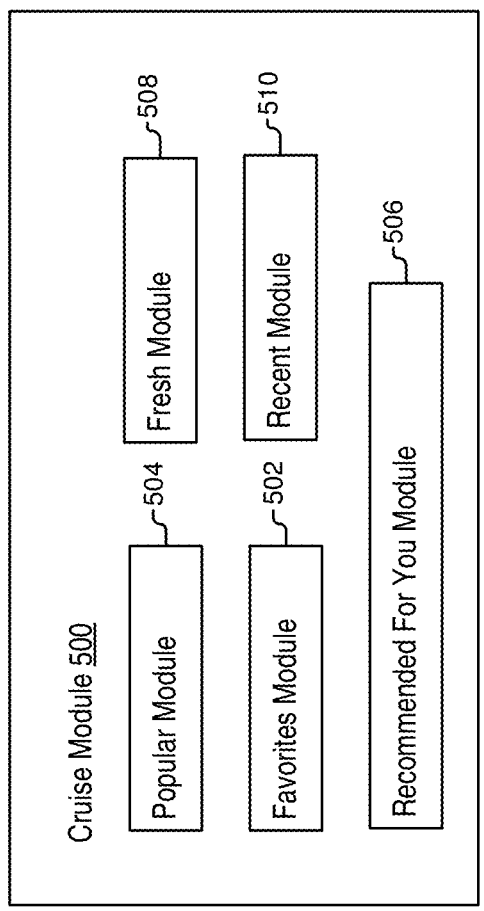
FIG. 5 illustrates an example cruise module, in accordance with an embodiment of the present disclosure.

FIG. 5 shows an example of a cruise module 500, in accordance with some embodiments of the present disclosure. In some embodiments, the cruise module 230 can be implemented as the cruise module 500. The cruise module 500 can include a fresh module 508, a popular module 504, a recent module 510, a favorites module 502, and a recommended for you module 506. The fresh module 508 can allow a user to browse, explore, and discover the product connections that are the most recent within the social shopping system 102 globally. The popular module 504 can allow a user to browse, explore, and discover the product connections that are the most popular within the social shopping system 102. The recent module 510 can allow a user to browse, explore, and discover the product connections that are the most recent within the user's network of friends. The favorites module 502 can allow the user to browse, explore, and discover the product connections that a user likes or has provided a kudo for in a favorites page supported by the social shopping system 102. The recommended for you module 506 can allow a user to browse, explore, and discover product connections that the social shopping system 102 has recommended for the user. The functionality provided by the cruise module 500 can be selected, for example, by appropriate user commands applied to a user interface presented to a user by the social shopping system 102.

Figure 6:
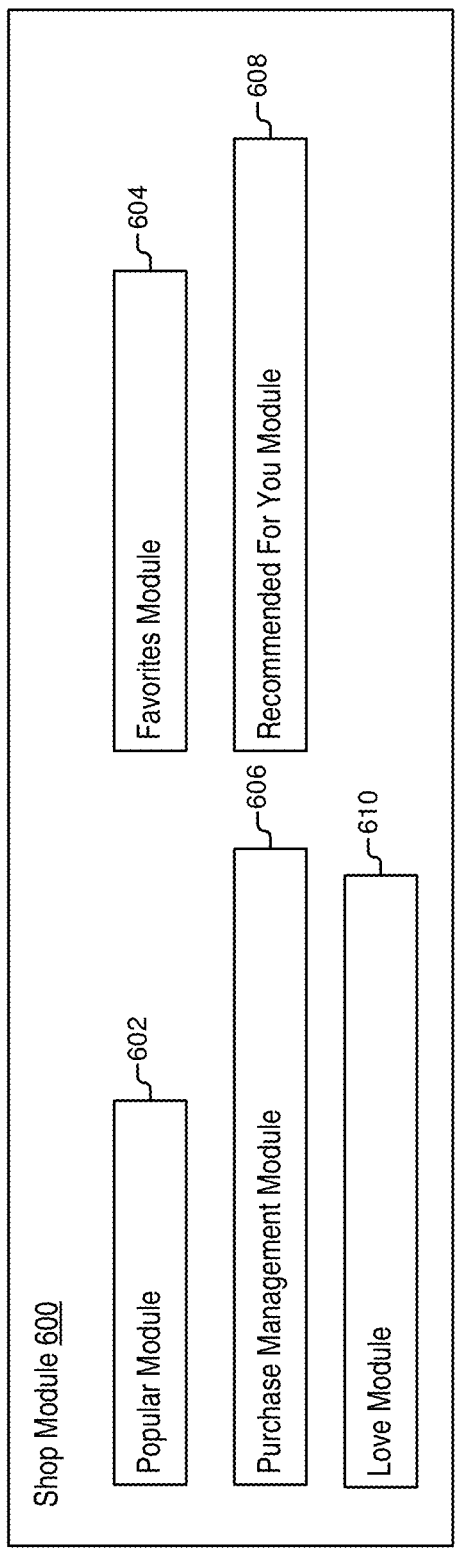
FIG. 6 illustrates an example shop module, in accordance with an embodiment of the present disclosure.

FIG. 6 shows an example shop module 600, in accordance with some embodiments of the present disclosure. In some embodiments, the shop module 234 can be implemented with the shop module 600. The shop module 600 can include a popular module 602, a favorites module 604, a love module 610, a recommended for you module 608, and a purchase management module 606. The popular module can allow a user to view and purchase products and/or services that are popular within the social shopping system 102. The favorites module 604 can allow a user to view and purchase products and/or services that may be considered a favorite by the social shopping system 102. The love module 610 can allow a user to save, view, and purchase products and/or services that the user may like and/or for which the user may provide a kudo. The recommended for you module 608 can allow a user to view and purchase products and/or services that the social shopping system 102 suggests to the user. When the shop module 600 detects that an image associated with a product or service is clicked by a user, the shop module 600 can present a webpage of an original website of a merchant that sells the product or service.

Figure 14:
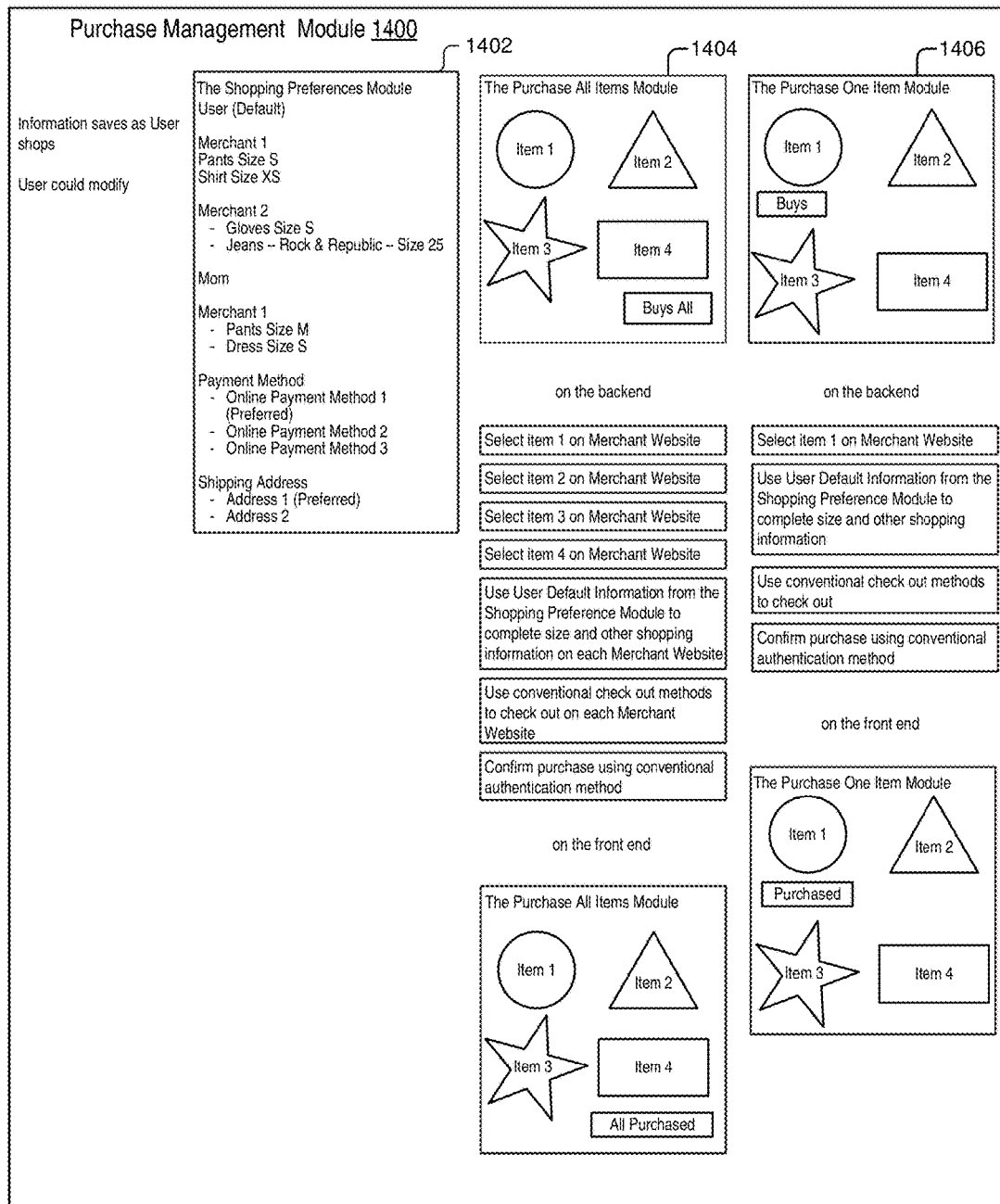
FIG. 14 illustrates an example purchase management module, in accordance with an embodiment of the present disclosure.

FIG. 14 shows an example purchase management module 1400 for managing purchases, including setting up a user shopping preference tool, in accordance with some embodiments of the present disclosure. In some embodiments, the purchase management module 606 can be implemented with the purchase management module 1400. The social shopping system 102 can create and present to a user a shop page, which is essentially a marketplace where the user may click on the product or service associated with a product connection and purchase the product or service from a merchant who sells the product or service. The social shopping system 102 can allow the user to purchase the product or service by clicking "buy" or "purchase" in relation to a product connection and checking out in accordance with a purchase management process.

The purchase management module 1400 can interact with other modules of the social shopping system 102 as follows:
 1. User selects a product connection.
 2. Selects buy all or buy one item.

3. A product is identified in the system by an image, URL, price etc. These pieces of information are stored in a database.

4. User is taken to the appropriate web site where he can purchase the products.

The purchase management module 1400 can allow a user to purchase a singular item or a group of products and/or services by simply clicking "buy" or "purchase" with respect to a product connection. The purchase management module 1400 can use the user's shopping preferences to provide the necessary information to check out on a merchant website, including the user's default sizes (e.g., size for clothing), default sizes for a particular merchant, default online payment method, and default shipping address. After a singular item or groups of products and/or services are purchased, the purchase management module 1400 can notify the user that such products and/or services are purchased.

The purchase management module 1400 can include a shopping preferences module 1402, a purchase all items module 1404, and a purchase one item module 1406.

The shopping preferences module 1402 can gather the shopping pattern data and smart data of a user to enable the user to check out more efficiently. Such information can include, for example, clothing size information for various merchants, payment methods, shipping address, as well as other data. The shopping preferences module 1402 can allow a user to provide shopping preferences and edit such preferences. In some embodiments, the social shopping system 102 can use this data to purchase the products for the user without directing the user to the merchant website. In this regard, the social shopping system 102 can allow the user to purchase an element or entirety of a product connection provided by one or more merchants directly from a website of the social shopping system 102.

The purchase all items module 1404 can allow a user to purchase all the items in a product connection. If the user purchases all items, the user may click on the product connection and select "buys all". The social shopping system 102 can select each item from the appropriate merchant website. The social shopping system 102 can use default information from the user's shopping preference page to complete size and other shopping information on each appropriate merchant website. The social shopping system 102 can use conventional online payment methods to check out on each merchant website and confirm each purchase using conventional authentication methods. After the completion of the purchase, the purchase management module 1400 can show an "all purchased" indication to the user, indicating to the user that all items have been purchased. The purchase may be completed without directing the user to other merchant websites.

The purchase one item module 1406 can allow a user to purchase one item in a product connection. If the user purchases one item, the user may click on the product connection and select "buys". The social shopping system 102 can select the item from the merchant website. The social shopping system 102 can use default information from the user's shopping preference page to complete size and other shopping information on the merchant website. The social shopping system 102 can use conventional online payment methods to check out on the merchant website and confirm the purchase using conventional authentication methods. After the completion of the purchase, the purchase management module 1400 can show a "purchased" indication to the user, indicating to the user that the item has been purchased. The purchase may be completed without directing the user to another merchant website.

Figure 7:
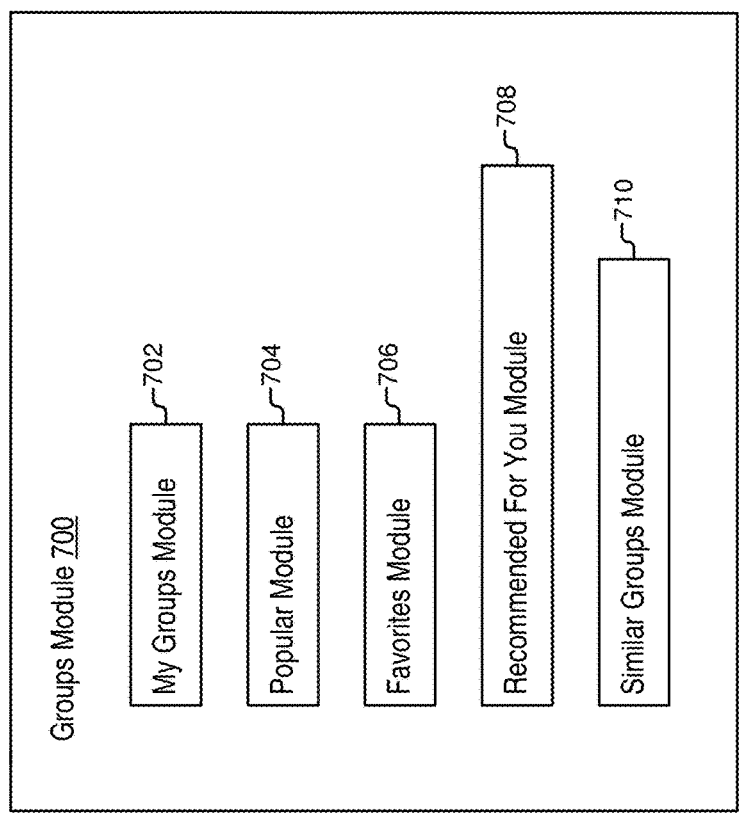
FIG. 7 illustrates an example groups module, in accordance with an embodiment of the present disclosure.

FIG. 7 shows an example groups module 700, in accordance with some embodiments of the present disclosure. In some embodiments, the groups module 232 can be implemented with the groups module 700. The groups module 700 can allow users to join, create, and participate in groups based on their flairs. The groups module 700 can interact with other modules of the social shopping system 102 by associating one or many product connections (and all the associated entities such as comments, likes, and kudos) with a particular group. The groups module 700 can allow a user to join a group or create a new group. The groups module 700 can allow the user to add an existing product connection to a group or create a new product connection.

The groups module 700 can allow a user or the social shopping system 102 to create a group and to determine the name of a group. For example, if a user has an interest in billiards, the user can create a group entitled "billiards" that users interested in billiards can join. Further, members of the group can place their bonds relating to billiards into the group or create new bonds relating to billiards for the group. The groups module 700 can allows users to become members of groups and can determine the product connections permitted to be in groups. The user can name a group, join a group, view membership of a group, view product connections in a group, or create a product connection for a group. The social shopping system 102 can also allow a user to post product connections in groups by using the product connection module 302.

The groups module 700 can include a my groups module 702, a popular module 704, a favorites module 706, a recommended for you module 708, and a similar groups module 710. The my groups module 702 can contain a list of groups of which the user is member. The popular module 704 can allow a user to view and join popular groups in the social shopping system 102. The favorites module 706 can allow a user to view and join groups that may be favorites of users. The recommended for you module 708 can allow a user to view and join groups that the social shopping system 102 has recommended to the user. The similar groups module 710 can suggest other groups that the user may be interested in joining.

Figure 8:
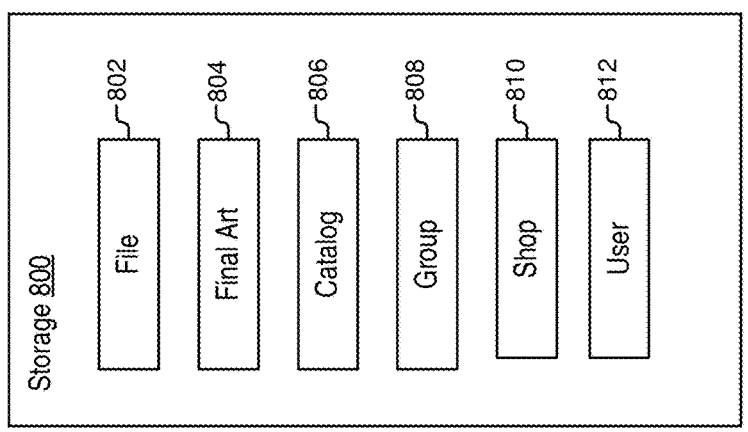
FIG. 8 illustrates an example storage, in accordance with an embodiment of the present disclosure.

FIG. 8 shows an example storage 800, in accordance with some embodiments of the present disclosure. In some embodiments, the storage 224 can be implemented with the storage 800. The storage 800 can include a file store 802, a final art store 804, a catalog store 806, a group store 808, a shop store 810, and a user store 812. The file store 802 can store various files used within the social shopping system 102, such as images of products and/or services. The final art store 804 can store published product connections as well as clip arts, fonts, and other enhancement media. A product connection maintained by the final art store 804 can include many entities such as images, videos, and other media. They all can be stored in various documents and associated with each other. The catalog store 806 can hold images of all products and/or services in a product catalog. The catalog store 806 also can enable users to retrieve products and/or services for the purpose of collaboration to build a product connection. The group store 808 can store data relating to associations between one or many product connections with a credential and other information relevant to the functionality of the groups module 700. The shop store 810 can hold information relevant to the functionality of the shop module 600. The user store 812 can maintain user profile information, such as a user's credentials that has been declared by the user as well as his product connections, network, location, and other user information.

Figure 15:
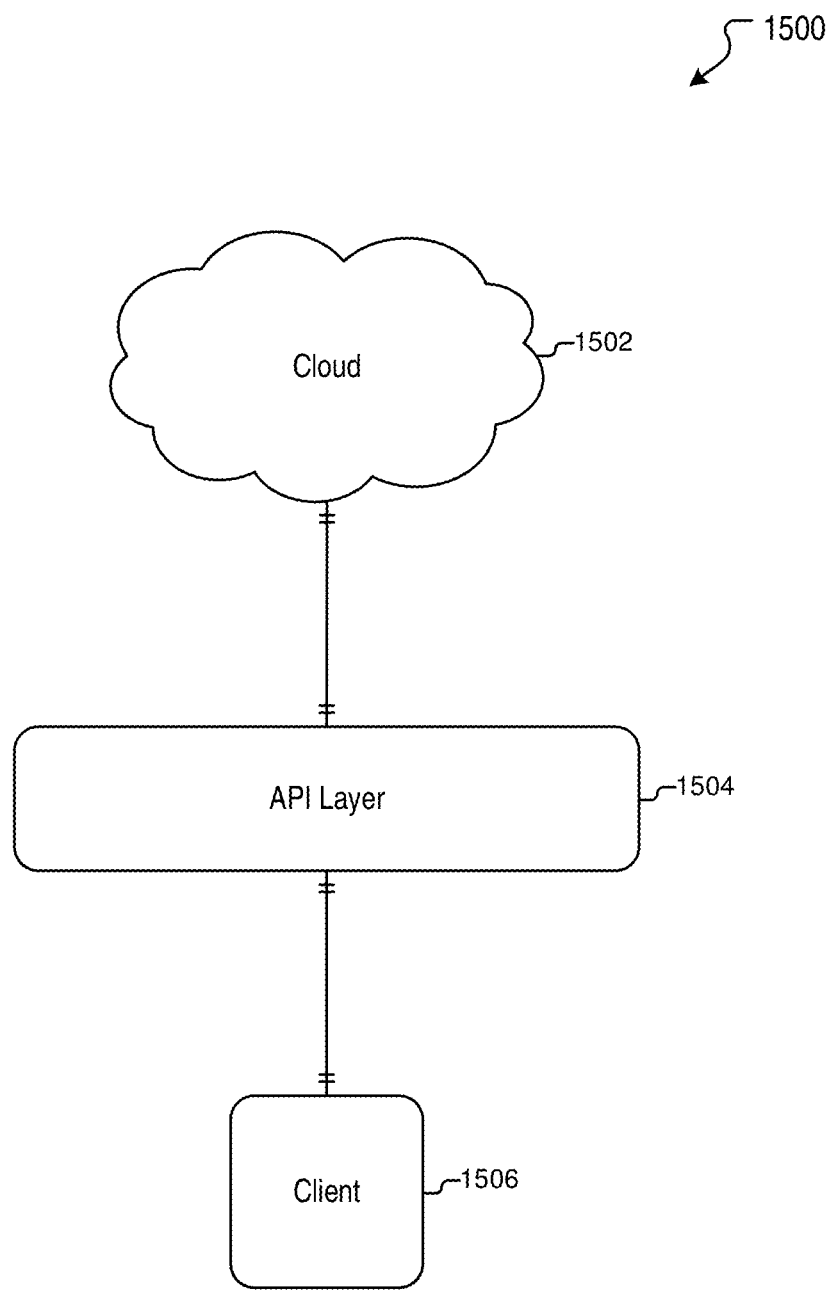
FIG. 15 illustrates an example system with which embodiments of the present disclosure can be implemented, in accordance with an embodiment of the present disclosure.

FIG. 15 shows an overview of an example system 1500 of basic components for the social shopping system 102, in accordance with some embodiments of the present disclosure. The system 1500 can include a cloud 1502, an API layer 1504, and a client 1506. The client 1506 can communicate with the cloud 1502 using the API layer 1504. In some embodiments, the API layer 1504 can be developed in a Ruby using Rails framework behind an Nginx web server. In some embodiments, the client 1506 can be developed in HTML5/CSS3 using the AngularJS framework. The client 1506 can communicate with the API layer 1504 to fetch data from the social shopping system 102 and display the data on the client 1506. The cloud 1502 can be implemented with one or more servers, caches, databases, etc.

Figure 16:
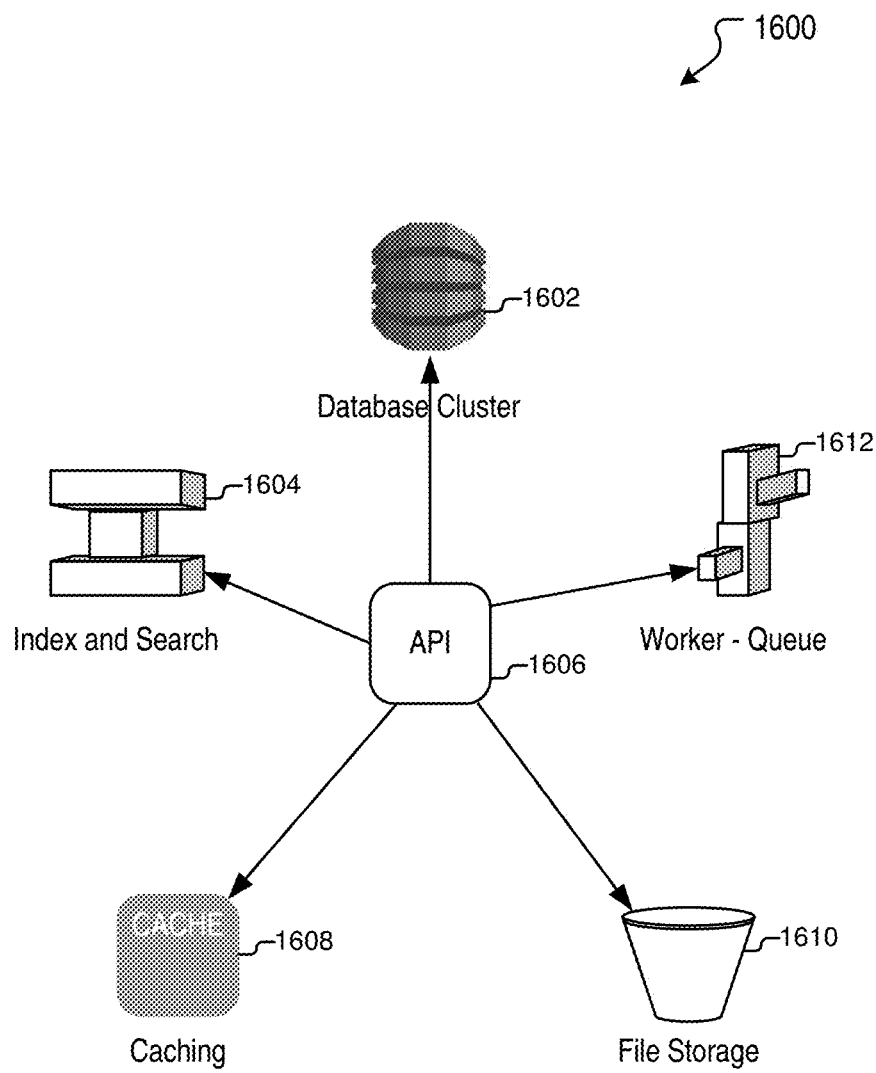
FIG. 16 illustrates an example system with which embodiments of a cloud can be implemented, in accordance with an embodiment of the present disclosure.

FIG. 16 shows an overview of an example system 1600 of basic components of a cloud, in accordance with some embodiments of the present disclosure. In some embodiments, the system 1600 can be a cloud that can be used to implement the cloud 1502. The system 1600 can include a database cluster 1602, an index and search 1604, an API layer 1606, a caching 1608, a file storage 1610, and a worker-queue 1612. In some embodiments, the database cluster 1602 can be implemented with a Mongodb cluster to store information maintained by the social shopping system 102. The API layer 1606 can communicate with the database cluster 1602. Setup of the worker-queue 1612 can be important for processing background calculations and reports and to ensure that synchronous responses are fast. In some embodiments, the worker-queue 1612 can be implemented using sidekiq. The file storage 1610 initially can maintain files and images. The caching 1608 can limit excessive queries to optimize fast responses. The index and search 1604 can support indexing, searching of data, and feed functionality. The index and search 1604 can support free text searches and fast results. The example system 1600 can perform other functionality to support the operation of the social shopping system 102.

Figure 17:
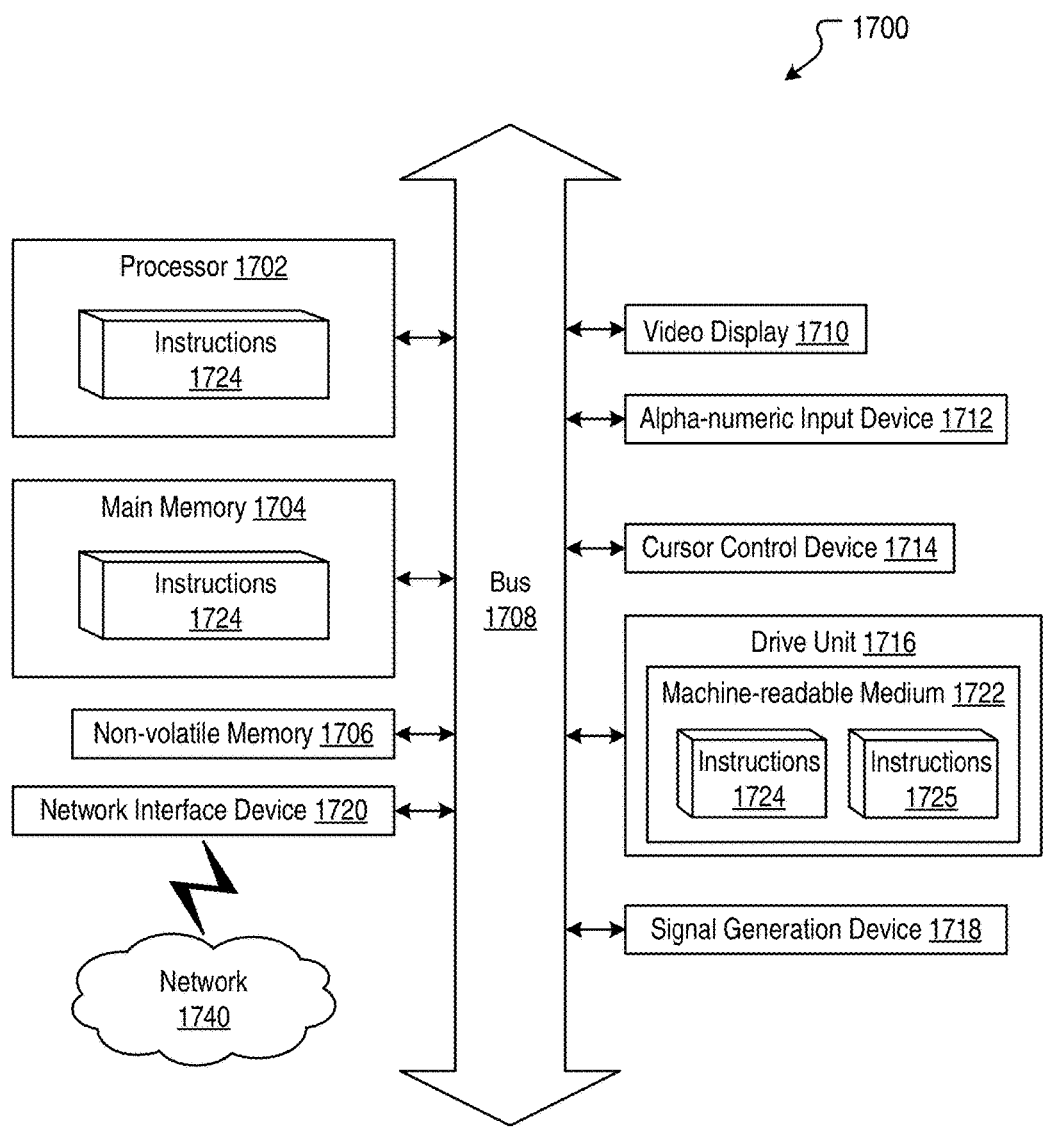
FIG. 17 illustrates an example machine with which embodiments of the present disclosure can be implemented, in accordance with an embodiment of the present disclosure.

FIG. 17 is a diagrammatic representation of an embodiment of an example machine (or computer system) 1700, within which a set of instructions for causing the machine to perform one or more of the embodiments or one or more of the functionalities described herein can be executed. The machine 1700 or many machines 1700 may perform any and all of the functionalities of the servers and modules of the social shopping system 102, the client, and the externals. Other types of machines can be used. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine may act as a server and communicate with other servers and clients to support the embodiments and functionality described herein.

The machine 1700 includes a processor 1702 (e.g., a central processing unit (CPU), a graphics processing unit (GPU), or both), a main memory 1704, and a nonvolatile memory 1706 (e.g., volatile RAM and non-volatile RAM), which communicate with each other via a bus 1708. In some embodiments, the machine 1700 can be a desktop computer, a laptop computer, personal digital assistant (PDA), or mobile phone, for example. In one embodiment, the machine 1700 also includes a video display 1710, an alphanumeric input device 1712 (e.g., a keyboard), a cursor control device 1714 (e.g., a mouse), a drive unit 1716, a signal generation device 1718 (e.g., a speaker) and a network interface device 1720.

In one embodiment, the video display 1710 includes a touch sensitive screen for user input. In one embodiment, the touch sensitive screen is used instead of a keyboard and mouse. The disk drive unit 1716 includes a machine-readable medium 1722 on which is stored one or more sets of instructions 1724 (e.g., software) embodying any one or more of the methodologies or functions described herein. The instructions 1724 can also reside, completely or at least partially, within the main memory 1704 and/or within the processor 1702 during execution thereof by the computer system 1700. The instructions 1724 can further be transmitted or received over a network 1740 via the network interface device 1720. In some embodiments, the machine-readable medium 1722 also includes a database 1725.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, the routines executed to implement the embodiments of the invention can be implemented as part of an operating system or a specific application, component, program, object, module or sequence of instructions referred to as "programs" or "applications". For example, one or more programs or applications can be used to execute specific processes or modules described herein. The programs or applications typically comprise one or more instructions set at various times in various memory and storage devices in the machine and that, when read and executed by one or more processors, cause the machine to perform operations to execute elements involving the various aspects of the embodiments described herein.

References herein to interactions "with a server" may mean, as indicated by the context in which the references appear, interactions between modules or functionality of one or more servers with modules or functionality of the same server or servers. Further, "server" as used herein may mean any module that performs the indicated functionality and "module" as used herein may mean any server that performs the indicated functionality.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "an example", "one embodiment", "an embodiment", "various embodiments", "another embodiment", "an instance", or the like means that a particular feature, design, structure, or characteristic described in connection with the embodiment is included in at least one embodiment of the disclosure. The appearances of, for example, the phrases "in an example", "according to an embodiment", "in one embodiment", "in an embodiment", or "in another embodiment" and the like in various places in the specification are not necessarily all referring to the same embodiment, nor are separate or alternative embodiments mutually exclusive of other embodiments. Moreover, whether or not there is express reference to an "example", "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention.

What is claimed is:

1. A computer-implemented method comprising:
   receiving, by a computing system, product connection information from a plurality of computing devices associated with a plurality of collaborating users, the product connection information from the plurality of computing devices including
      a first set of product information associated with a first product, the first set of product information including an image associated with the first product, and
      a second set of product information associated with a second product, the second set of product information including an image associated with the second product;
   creating, by the computing system, a product connection object based on the product connection information from the plurality of computing devices, wherein the product connection object associates the first product and the second product with one another and indicates that the plurality of collaborating users recommend the first product and the second product to be used together;
   providing, by the computing system, the product connection object to a first user by publishing the product connection object to a feed presented to the first user, the feed comprising a plurality of product connection objects;
   receiving, by the computing system, via the feed, an indication that the first user endorses the product connection object; and dynamically updating, by the computing system, the feed to indicate that the first user endorses the product connection object.

2. The computer-implemented method of claim 1, further comprising:
controlling at least one of a number of the plurality of collaborating users in collaboration to create the product connection, a time period during which collaboration can occur, content to be included in the product connection object, and frequency of sessions during which collaboration can occur.

3. The computer-implemented method of claim 2, wherein the controlling is based at least in part on an input applied by a first collaborating user of the plurality of collaborating users to a first computing device associated with the first collaborating user.

4. The computer-implemented method of claim 1, wherein the plurality of computing devices include client devices in remote communication with the computing system.

5. The computer-implemented method of claim 1, further comprising:
in response to receipt of a selection of the first product of the product connection object by the first user, performing an online checkout to purchase the first product based on personal information and financial information of the first user without directing the first user to a website of a merchant of the first product.

6. The computer-implemented method of claim 1, further comprising:
associating the product connection object with at least one credential of at least one collaborating user of the plurality of collaborating users; and
providing the at least one credential for display with the product connection object.

7. The computer-implemented method of claim 1, further comprising:
providing an interface to a computing device associated with a first collaborating user of the plurality of collaborating users including one or more selectable options to allow the first collaborating user to at least one of associate credentials of the first collaborating with the product connection object, share the product connection object with friends, and access other product connection objects related to the product connection object.

8. The computer-implemented method of claim 1, further comprising:
providing an interface to a computing device associated with a user including one or more selectable options to allow the user to at least one of share the product connection object with friends, like the product connection object, provide kudos to the product connection object, review the product connection object, and access other product connection objects related to the product connection object.

9. The computer-implemented method of claim 1, further comprising:
providing an editing tool to a computing device associated with at least one collaborating user of the plurality of collaborating users, the editing tool including an option to remove white space or noise from an image associated with a product of the product connection object.

10. The computer-implemented method of claim 1, further comprising:
receiving an amount of kudos, likes, comments, and reviews regarding the product connection object; and
assigning a measure of validation of credentials of a first collaborating user of the plurality of collaborating users based on the amount of kudos, likes, comments, and reviews regarding the product connection.

11. The computer-implemented method of claim 1, further comprising:
determining that a first collaborating user of the plurality of collaborating users has achieved a first user status based on a threshold amount of activity associated with one or more product connection objects associated with the first collaborating user; and
sharing with the first collaborating user at least a portion of revenue generated by the one or more product connection objects associated with the first collaborating user.

12. The computer-implemented method of claim 1, further comprising:
providing to at least one collaborating user of the plurality of collaborating users an editing tool including an option to cut out a background portion of an image associated with a product of the product connection object.

13. The computer-implemented method of claim 1, further comprising:
providing a feed to a second user comprising product connection objects associated with friends of the second user.

14. The computer-implemented method of claim 1, wherein the providing the product connection object to the first user comprises:
indicating that at least one product associated with a portion of the product connection object is available for purchase.

15. The computer-implemented method of claim 1, further comprising:
embedding at least one link in the product connection object, the link selectable for causing presentation of a website associated with at least one product associated with the product connection object.

16. The computer-implemented method of claim 1, further comprising:
maintaining a store of images associated with goods or services to be included in product connection objects.

17. The computer-implemented method of claim 16, wherein at least a portion of the images in the store of images is provided by the plurality of collaborating users.

18. A system comprising:
at least one processor; and
a memory storing instructions that, when executed by the at least one processor, cause the system to perform:
receiving product connection information from a plurality of computing devices associated with a plurality of collaborating users, the product connection information from the plurality of computing devices including
a first set of product information associated with a first product, the first set of product information including an image associated with the first product, and
a second set of product information associated with a second product, the second set of product information including an image associated with the second product;
creating a product connection object based on the product connection information from the plurality of computing devices, wherein the product connection object associated the first product and the second product with one another and indicates that the plurality of collaborating users recommend the first product and the second product to be used together;

providing the product connection object to a first user by publishing the product connection object to a feed presented to the first user, the feed comprising a plurality of product connection objects;

receiving, via the feed, an indication that the first user endorses the product connection object; and dynamically updating the feed to indicate that the first user endorses the product connection object.

19. A non-transitory computer-readable storage medium including instructions that, when executed by at least one processor of a computing system, cause the computing system to perform:

receiving, by a computing system, product connection information from a plurality of computing devices associated with a plurality of collaborating users, the product connection information from the plurality of computing devices including a first set of product information associated with a first product, the first set of product information including an image associated with the first product, and a second set of product information associated with a second product, the second set of product information including an image associated with the second product;

creating, by the computing system, a product connection object based on the product connection information from the plurality of computing devices, wherein the product connection object associates the first product and the second product with one another and indicates that the plurality of collaborating users recommend the first product and the second product to be used together;

providing, by the computing system, the product connection object to a first user by publishing the product connection object to a feed presented to the first user, the feed comprising a plurality of product connection objects;

receiving, by the computing system, via the feed, an indication that the first user endorses the product connection object; and dynamically updating, by the computing system the feed to indicate that the first user endorses the product connection object.

\* \* \* \* \*